(12) United States Patent
Kodama et al.

(10) Patent No.: US 12,472,019 B2
(45) Date of Patent: Nov. 18, 2025

(54) ROBOTIC SURGICAL SYSTEM, OPERATION APPARATUS AND OPERATION APPARATUS CONTROL METHOD

(71) Applicant: KAWASAKI JUKOGYO KABUSHIKI KAISHA, Kobe (JP)

(72) Inventors: Kazuki Kodama, Kobe (JP); Yusuke Takano, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 167 days.

(21) Appl. No.: 18/460,774

(22) Filed: Sep. 5, 2023

(65) Prior Publication Data

US 2024/0081927 A1 Mar. 14, 2024

(30) Foreign Application Priority Data

Sep. 6, 2022 (JP) .................................. 2022-141304

(51) Int. Cl.
*A61B 34/30* (2016.01)
*A61B 34/00* (2016.01)

(52) U.S. Cl.
CPC .............. *A61B 34/30* (2016.02); *A61B 34/25* (2016.02); *A61B 34/74* (2016.02); *A61B 2034/301* (2016.02); *A61B 2034/306* (2016.02)

(58) Field of Classification Search
CPC ......... A61B 34/30; A61B 34/25; A61B 34/74; A61B 2034/301; A61B 2034/306; A61B 90/37; A61B 2090/061; A61B 2090/067; A61B 34/37

See application file for complete search history.

(56) References Cited

U.S. PATENT DOCUMENTS

| | | | |
|---|---|---|---|
| 6,113,596 A * | 9/2000 | Hooven | A61B 18/14 606/42 |
| 6,522,906 B1 * | 2/2003 | Salisbury, Jr. | A61B 1/0005 600/407 |
| 8,120,301 B2 * | 2/2012 | Goldberg | G16H 40/67 318/432 |
| 8,335,590 B2 | 12/2012 | Costa et al. | |
| 8,418,073 B2 * | 4/2013 | Mohr | A61B 18/1233 715/764 |
| 8,808,164 B2 | 8/2014 | Hoffman et al. | |
| 9,054,631 B2 * | 6/2015 | Kwon | H02P 31/00 |
| 9,301,811 B2 * | 4/2016 | Goldberg | A61B 90/98 |
| 9,375,288 B2 * | 6/2016 | Robinson | A61B 34/30 |
| 9,700,343 B2 * | 7/2017 | Messerly | A61B 17/320068 |
| 9,724,118 B2 * | 8/2017 | Schulte | A61B 18/1206 |
| 10,052,165 B2 * | 8/2018 | Cohen | B25J 13/088 |
| 10,070,930 B2 * | 9/2018 | Cohen | A61B 34/76 |

(Continued)

FOREIGN PATENT DOCUMENTS

| | | |
|---|---|---|
| EP | 3628207 A1 | 4/2020 |
| JP | 2021-23706 A | 2/2021 |

*Primary Examiner* — Bhavesh V Amin
(74) *Attorney, Agent, or Firm* — METROLEX IP LAW GROUP, PLLC; Robert L. Scott, Esq.

(57) ABSTRACT

A robotic surgical system according to this disclosure includes a controller configured to control at least one of the first driver and the second driver to maintain a distance between the first operation unit and the second operation unit when a third operation to move the endoscope by the first operation unit and the second operation unit is received.

14 Claims, 20 Drawing Sheets

(56) References Cited

U.S. PATENT DOCUMENTS

| | | | | |
|---|---|---|---|---|
| 10,092,344 B2* | 10/2018 | Mohr | | A61B 18/12 |
| 10,136,954 B2* | 11/2018 | Johnson | | B25J 13/065 |
| 10,149,680 B2* | 12/2018 | Parihar | | A61B 17/115 |
| 10,299,883 B2* | 5/2019 | Kilroy | | A61B 90/10 |
| 10,376,337 B2* | 8/2019 | Kilroy | | A61B 90/50 |
| 10,383,699 B2* | 8/2019 | Kilroy | | A61B 90/11 |
| 10,463,438 B2* | 11/2019 | Cohen | | A61B 17/28 |
| 10,617,481 B2* | 4/2020 | Cohen | | A61B 17/28 |
| 10,786,315 B2 | 9/2020 | Suresh et al. | | |
| 10,864,048 B2* | 12/2020 | Holop | | A61B 34/30 |
| 11,116,589 B2* | 9/2021 | Cohen | | A61B 90/03 |
| 11,478,313 B2* | 10/2022 | Ishihara | | A61B 18/14 |
| 11,771,511 B2* | 10/2023 | Cohen | | A61B 34/70 606/1 |
| 11,969,226 B2* | 4/2024 | Cohen | | A61B 34/30 |
| 2005/0228256 A1* | 10/2005 | Labadie | | A61B 90/36 600/407 |
| 2006/0142657 A1* | 6/2006 | Quaid | | A61B 90/37 600/424 |
| 2007/0021738 A1* | 1/2007 | Hasser | | A61B 8/12 606/1 |
| 2008/0004603 A1* | 1/2008 | Larkin | | A61B 34/25 606/1 |
| 2008/0217564 A1* | 9/2008 | Beyar | | A61B 6/462 250/515.1 |
| 2009/0036902 A1* | 2/2009 | DiMaio | | A61B 8/12 606/130 |
| 2009/0326322 A1* | 12/2009 | Diolaiti | | A61B 34/30 600/112 |
| 2009/0326553 A1* | 12/2009 | Mustufa | | A61B 34/74 606/130 |
| 2010/0082039 A1* | 4/2010 | Mohr | | B25J 9/1692 700/83 |
| 2010/0228249 A1* | 9/2010 | Mohr | | A61B 1/000096 715/764 |
| 2010/0228264 A1* | 9/2010 | Robinson | | A61B 18/1206 606/130 |
| 2010/0274087 A1* | 10/2010 | Diolaiti | | A61B 34/71 600/407 |
| 2011/0040305 A1* | 2/2011 | Gomez | | A61B 34/74 606/130 |
| 2011/0071543 A1* | 3/2011 | Prisco | | A61B 34/76 600/118 |
| 2011/0160745 A1* | 6/2011 | Fielding | | A61B 34/76 606/130 |
| 2011/0306986 A1* | 12/2011 | Lee | | A61B 34/37 606/130 |
| 2012/0283876 A1 | 11/2012 | Goldberg et al. | | |
| 2013/0331644 A1* | 12/2013 | Pandya | | A61B 34/30 600/102 |
| 2014/0171959 A1* | 6/2014 | Yacono | | G02B 21/0012 606/128 |
| 2014/0222021 A1* | 8/2014 | Diolaiti | | A61B 34/37 606/130 |
| 2014/0277741 A1* | 9/2014 | Kwon | | A61B 34/37 700/263 |
| 2015/0320500 A1* | 11/2015 | Lightcap | | A61B 90/06 901/8 |
| 2016/0045272 A1* | 2/2016 | Diolaiti | | A61B 34/71 606/130 |
| 2016/0242860 A1* | 8/2016 | Diolaiti | | A61B 1/00087 |
| 2016/0361127 A1* | 12/2016 | Dachs, II | | A61B 90/361 |
| 2017/0000574 A1 | 1/2017 | Itkowitz et al. | | |
| 2017/0055995 A1* | 3/2017 | Weir | | A61B 17/068 |
| 2017/0071681 A1 | 3/2017 | Peine | | |
| 2017/0112581 A1* | 4/2017 | Cohen | | A61B 17/3201 |
| 2017/0135776 A1* | 5/2017 | Cohen | | B25J 13/065 |
| 2017/0172675 A1* | 6/2017 | Jarc | | A61B 34/35 |
| 2017/0258538 A1* | 9/2017 | Cohen | | A61B 34/70 |
| 2017/0258539 A1* | 9/2017 | Cohen | | A61B 34/30 |
| 2017/0333145 A1* | 11/2017 | Griffiths | | A61B 34/35 |
| 2018/0000548 A1* | 1/2018 | Olds | | A61B 34/35 |
| 2018/0023946 A1* | 1/2018 | Elliot | | B25J 9/1692 356/614 |
| 2018/0049792 A1* | 2/2018 | Eckert | | A61B 34/30 |
| 2018/0049829 A1* | 2/2018 | Yates | | A61B 34/30 |
| 2018/0049830 A1* | 2/2018 | Yates | | A61B 34/35 |
| 2018/0049832 A1* | 2/2018 | Eckert | | A61B 34/30 |
| 2018/0110573 A1* | 4/2018 | Kostrzewski | | B25J 15/0019 |
| 2018/0132956 A1* | 5/2018 | Cameron | | A61B 34/37 |
| 2018/0185113 A1* | 7/2018 | Gregerson | | G06T 7/74 |
| 2018/0267627 A1* | 9/2018 | Kaneko | | G06F 3/0346 |
| 2018/0279594 A1* | 10/2018 | Raskas | | G05D 1/0038 |
| 2018/0303568 A1* | 10/2018 | Iorgulescu | | A61B 34/25 |
| 2019/0047154 A1* | 2/2019 | Itkowitz | | B25J 9/1697 |
| 2019/0083187 A1* | 3/2019 | Danitz | | A61B 34/32 |
| 2019/0110847 A1* | 4/2019 | Diolaiti | | A61B 34/71 |
| 2019/0120633 A1* | 4/2019 | Afrouzi | | G01S 7/4808 |
| 2019/0192144 A1* | 6/2019 | Parfett | | A61B 17/07207 |
| 2019/0200998 A1* | 7/2019 | Shelton, IV | | A61B 5/0066 |
| 2019/0246882 A1* | 8/2019 | Graetzel | | A61B 1/0016 |
| 2019/0298458 A1* | 10/2019 | Srinivasan | | A61B 34/20 |
| 2020/0015925 A1* | 1/2020 | Scheib | | A61B 1/07 |
| 2020/0078097 A1* | 3/2020 | Gregerson | | B25J 9/1666 |
| 2020/0093551 A1* | 3/2020 | Ishihara | | A61B 18/1206 |
| 2020/0093552 A1* | 3/2020 | Ishihara | | A61B 34/25 |
| 2020/0100853 A1* | 4/2020 | Ho | | A61B 34/71 |
| 2020/0170736 A1* | 6/2020 | Cohen | | A61B 17/28 |
| 2020/0261297 A1* | 8/2020 | Strydom | | A61B 34/10 |
| 2020/0289205 A1* | 9/2020 | Scheib | | G01S 17/08 |
| 2020/0289219 A1* | 9/2020 | Denlinger | | B25J 13/02 |
| 2020/0289222 A1* | 9/2020 | Denlinger | | B25J 9/1664 |
| 2020/0289223 A1* | 9/2020 | Denlinger | | A61B 34/77 |
| 2020/0289225 A1* | 9/2020 | Cohen | | A61B 34/30 |
| 2020/0289228 A1* | 9/2020 | Denlinger | | A61B 6/504 |
| 2020/0289229 A1* | 9/2020 | Denlinger | | G06T 7/50 |
| 2020/0289230 A1* | 9/2020 | Denlinger | | A61B 34/74 |
| 2021/0038336 A1 | 2/2021 | Ogata et al. | | |
| 2021/0290326 A1* | 9/2021 | Diolaiti | | A61B 34/30 |
| 2021/0330410 A1* | 10/2021 | Kishida | | A61B 34/74 |
| 2023/0032548 A1* | 2/2023 | Kobayashi | | A61B 34/25 |
| 2024/0016564 A1* | 1/2024 | Cohen | | A61B 34/72 |
| 2024/0081927 A1* | 3/2024 | Kodama | | A61B 90/37 |
| 2025/0057615 A1* | 2/2025 | Tojo | | B25J 9/1689 |
| 2025/0127582 A1* | 4/2025 | Ichii | | B25J 9/0087 |

* cited by examiner

ROBOTIC SURGICAL SYSTEM, OPERATION APPARATUS AND OPERATION APPARATUS CONTROL METHOD

CROSS-REFERENCE TO RELATED APPLICATION

The priority application number JP2022-141304, a robotic surgical system and an operation apparatus control method, Sep. 6, 2022, Kazuki Kodama and Yusuke Takano, upon which this patent application is based, are hereby incorporated by reference.

BACKGROUND OF THE INVENTION

Field of the Invention

The present disclosure relates to a robotic surgical system, an operation apparatus and an operation apparatus control method.

Description of the Background Art

Conventionally, a robotic surgical system including a robot arm to which a surgical instrument is attached is known. United States patent application publication No. US2012/0283876 discloses a robot operation system including manipulator arms and a master control console configured to control the manipulator arm. The master control console includes a pair of master controllers configured to be operated by operator's right and the left hands. Several manipulator arms are provided. A surgical instrument or an endoscope is attached to the manipulator arm.

In the conventional robot operation system disclosed in the United States patent application publication No. US2012/0283876, the manipulator arm to which the endoscope is attached can be controlled by the operator by simultaneously operating both the master controllers while pressing down a foot pedal configured to enable movement of the endoscope. On the other hand, the manipulator arm to which the surgical instrument is attached can be controlled by the operator by operating on of the pair of master controllers while the foot pedal being released from the pressing by the operator. In a case in which a relative position between the pair of master controllers changes so that a relative distance between a pair of master controllers correspondingly changes when the operator simultaneously operates both the master controllers while pressing down the foot pedal, such a relative distance change will cause the operator to feel that something is wrong when restarting control of the manipulator arm to which the surgical instrument is attached. In this case, the operator will move the master controllers as a pair of operation unit to the relative position of the master controllers to their original position. Such moving of the master controllers is a wasted motion for operators.

SUMMARY OF THE INVENTION

The present disclosure provides a robotic surgical system, an operation apparatus and an operation apparatus control method capable of reducing a wasted motion of operators after movement of an endoscope.

A robotic surgical system according to a first aspect of the present disclosure includes a surgical apparatus including a plurality of robot arms configured to support an endoscope, a first surgical instrument and a second surgical instrument; an operation apparatus including a first operation unit that is configured to be operated by a right hand of an operator to receive a first operation for the first surgical instrument and includes a first driver, and a second operation unit that is configured to be operated by a left hand of the operator to receive a second operation for the second surgical instrument and includes a second driver; and a controller, wherein the controller is configured to control at least one of the first driver and the second driver to maintain a distance between the first operation unit and the second operation unit when a third operation to move the endoscope by the first operation unit and the second operation unit is received.

In the robotic surgical system according to the first aspect of the present disclosure, the controller is configured to control at least one of the first driver and the second driver to maintain a distance between the first operation unit and the second operation unit when a third operation to move the endoscope by the first operation unit and the second operation unit is received. Accordingly, a distance between the first operation unit and the second operation unit after movement of the endoscope can be the same as before the movement of the endoscope. Consequently, operators unnecessarily move the first operation unit and the second operation unit to their original relative position. Therefore, it is possible to reduce a wasted motion of operators after movement of the endoscope.

An operation apparatus configured to control a first surgical instrument held by a first robot arm, a second surgical instrument held by a second robot arm, and an endoscope held by a third robot arm, the operation apparatus according to a second aspect of the present disclosure comprising: a first operation unit that is configured to be operated by a right hand of an operator to receive a first operation for the first surgical instrument and includes a first driver; a second operation unit that is configured to be operated by a left hand of the operator to receive a second operation for the second surgical instrument and includes a second driver; and an input configured to allow accepting a third operation to move the endoscope by the first operation unit and the second operation unit during operated by the operator, wherein the first driver and the second driver are driven to maintain a distance between the first operation unit and the second operation unit during a fourth operation of the input is received.

An operation apparatus control method according to a third aspect of the present disclosure is a method, in a robotic surgical system including a surgical apparatus including a plurality of robot arms configured to support an endoscope, a first surgical instrument and a second surgical instrument; an operation apparatus including a first operation unit that is configured to be operated by a right hand of an operator to receive a first operation for the first surgical instrument and includes a first driver, and a second operation unit that is configured to be operated by a left hand of the operator to receive a second operation for the second surgical instrument and includes a second driver; and a controller, the method performed by the controller comprising: receiving a third operation to move the endoscope by the first operation unit and the second operation unit; and controlling at least one of the first driver and the second driver to maintain a distance between the first operation unit and the second operation unit when the third operation is received.

In the operation apparatus control method according to the second aspect of the present disclosure, as discussed above, controlling at least one of the first driver and the second driver to maintain a distance between the first operation unit and the second operation unit when the third operation is received. Accordingly, a distance between the first operation unit and the second operation unit after movement of the endoscope can be the same as before the movement of the endoscope. Consequently, operators unnecessarily move the first operation unit and the second operation unit to their original relative position. Therefore, it is possible to provide a method of controlling a robotic surgical system capable of reducing a wasted motion of operators after movement of the endoscope.

According to the present disclosure, it is possible to reduce a wasted motion of operators after movement of an endoscope.

Figure 1:
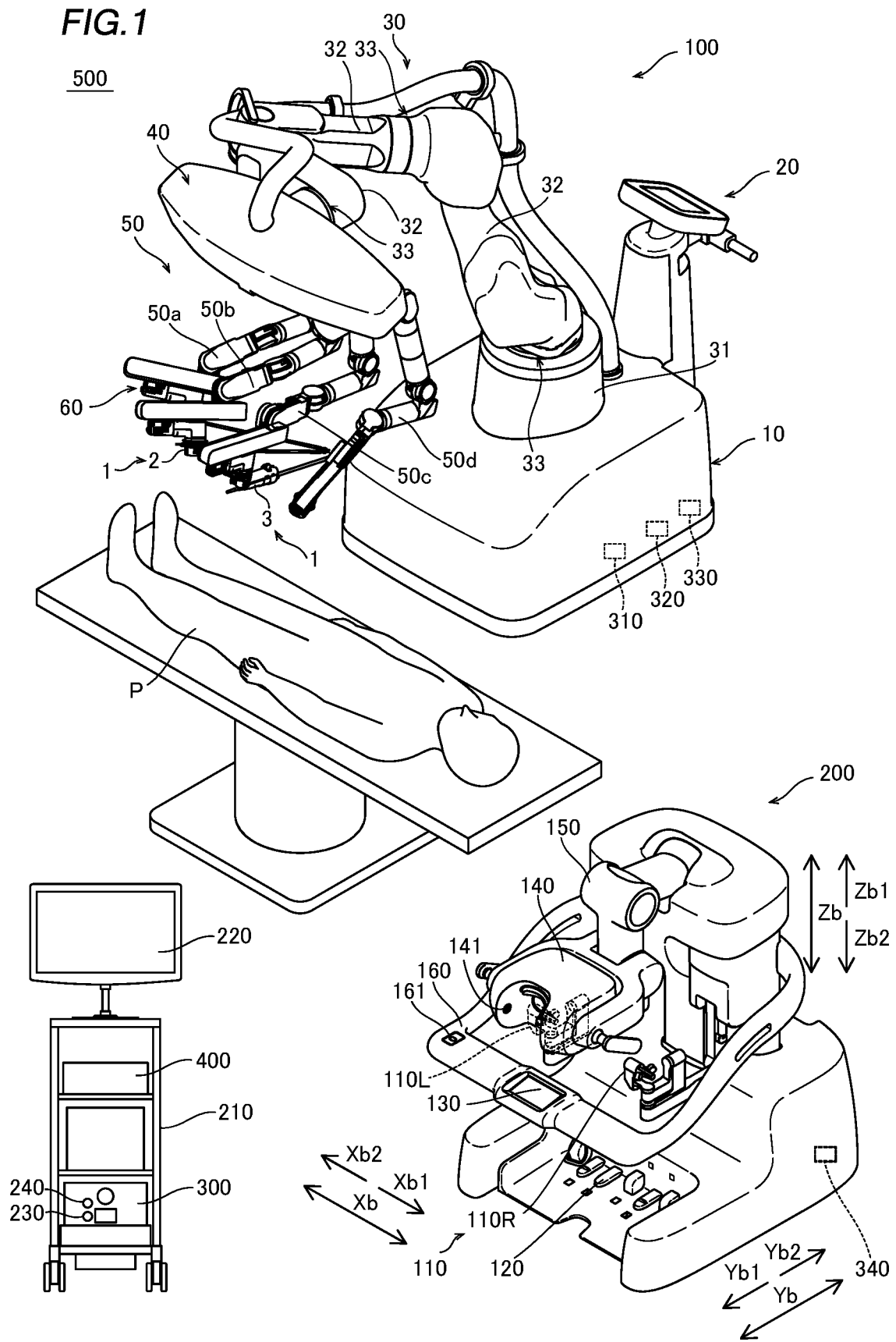
FIG. 1 is a block diagram showing a configuration of a robotic surgical system according to one embodiment.

DESCRIPTION OF THE PREFERRED EMBODIMENT (Configuration of Robotic Surgical System)

The following description describes a configuration of a robotic surgical system 500 according to this embodiment. The robotic surgical system 500 includes a surgical robot 100, a remote control apparatus 200, a vision unit 300 and an image processing unit 400. The surgical robot 100 and the remote control apparatus 200 are an example of a surgical apparatus and an example of an operation apparatus, respectively.

Figure 4:
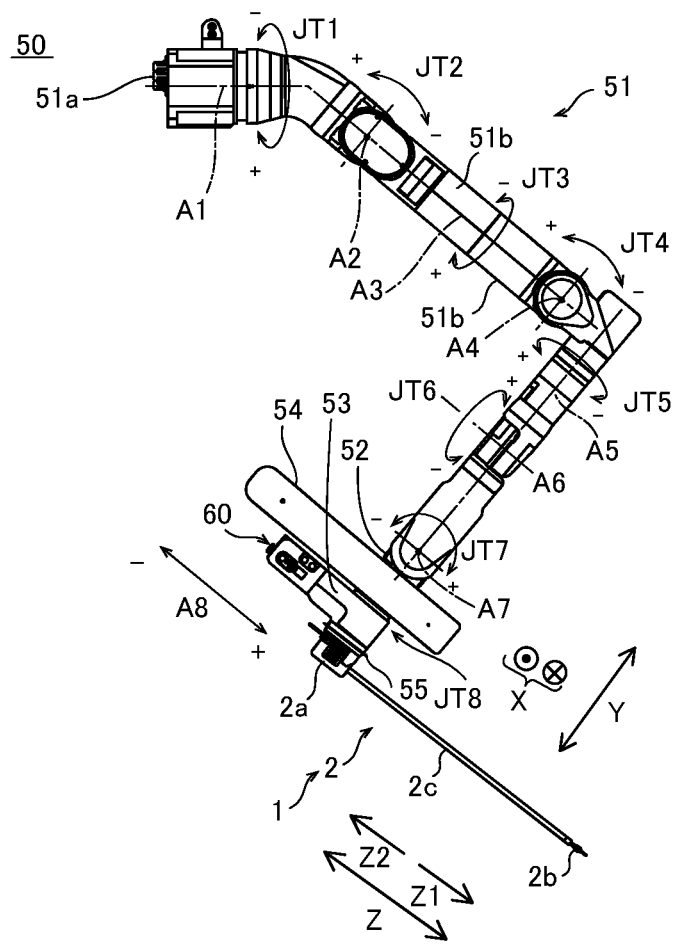
FIG. 4 is a block diagram showing a configuration of a robot arm according to the one embodiment.

In this specification, a longitudinal direction of a surgical instrument 1 is defined as a Z direction as shown in FIG. 4. A fore-end side of the surgical instrument 1 is defined as a Z1 side, and a base-end side of the surgical instrument 1 is defined as a Z2 side. A direction orthogonal to the Z direction is defined as an X direction. A direction orthogonal to the Z direction and the X direction is defined as a Y direction. The surgical instrument 1 is an example of a first surgical instrument and an example of a second surgical instrument.

Figure 3:
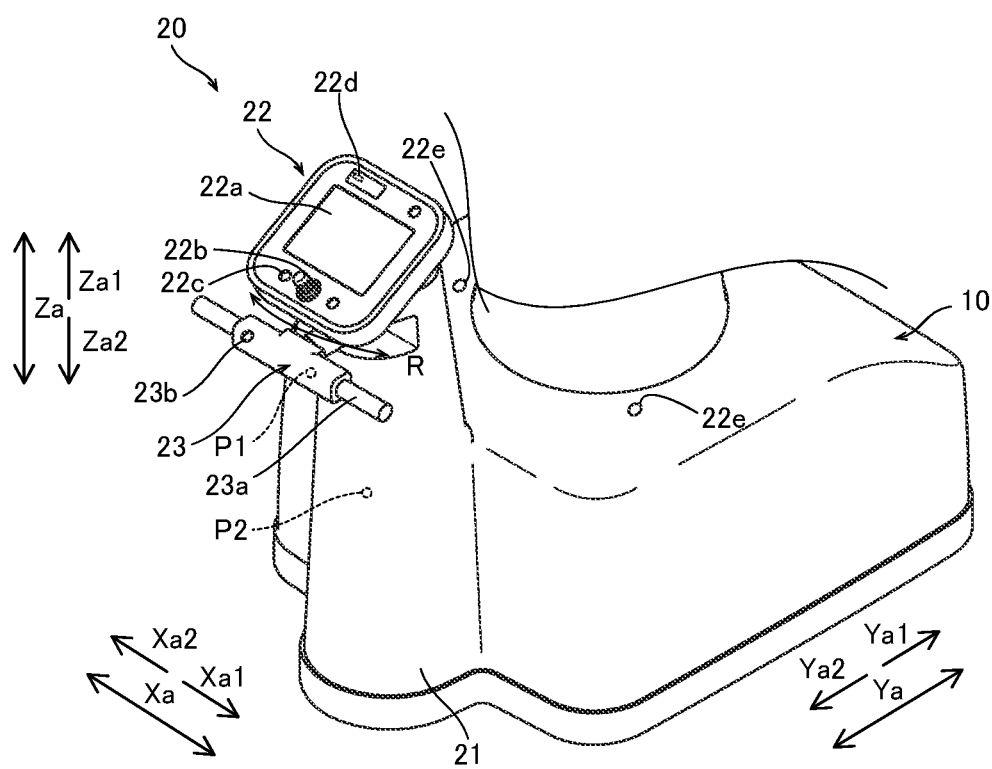
FIG. 3 is a diagram showing a configuration of the medical cart according to the one embodiment.

In this specification, a leftward/rightward direction from the viewpoint of an operator who operates a display 22a of an input 22 is defined as an Xa direction as shown in FIG. 3. A rightward direction is defined as an Xa1 direction, and a leftward direction is defined as an Xa2 direction. A frontward/rearward direction from the viewpoint of the operator who operates the display 22a of the input 22 is defined as a Ya direction. A frontward direction is defined as an Ya1 direction, and a rearward direction is defined as an Ya2 direction. A direction orthogonal to a floor on which the surgical robot 100 is arranged is defined as a Za direction. An upward direction is defined as a Za1 direction, and a downward direction is defined as a Za2 direction.

In this specification, as shown in FIG. 1, a direction orthogonal to a floor on which the remote control apparatus 200 is placed is defined as a Zb direction, the frontward/rearward direction of the operator who operates the operation unit 110, which is orthogonal to the Zb direction, is defined a Yb direction, and a direction orthogonal to the Zb direction and the Yb direction is defined as an Xb direction. In the Zb directions, an upward direction is defined as a Zb1 direction, and a downward direction is defined as a Zb2 direction. In the Yb directions, one is defined as an Yb1 direction, and another is defined as an Yb2 direction. In the Xb directions, one is defined as an Xb1 direction, and another is defined as an Xb2 direction. Axes corresponding to the Xb, Yb and Zb directions are occasionally referred to as Xb, Yb and Zb axes, respectively. The Xb, Yb and Zb axes are examples of third, second and first axes, respectively.

As shown in FIG. 1, the surgical robot 100 is arranged in an operating room. The remote control apparatus 200 is located remote from the surgical robot 100. Also, the remote control apparatus 200 is configured to receive operations as to the surgical instruments 1. Specifically, an operator, such as a doctor, can provide the remote control apparatus 200 with an instruction to instruct a desired motion of the surgical robot 100. The remote control apparatus 200 transmits the provided command to the surgical robot 100. The surgical robot 100 is configured to perform the motion in accordance with the command received. The surgical robot 100 is arranged in the operating room, which is a sterile field.

(Configuration of Surgical Robot)

As shown in FIG. 1, the surgical robot 100 includes a medical cart 10, a cart positioner operation unit 20, a positioner 30, an arm base 40, a plurality of robot arms 50 and arm operation units 60 provided in the robot arms 50. The arm operation unit 60 is an example of an operation unit.

As shown in FIG. 3, the cart positioner operation unit 20 is arranged in a rear part of the medical cart 10 and supported by a cart positioner operation support 21, and the medical cart 10 or the positioner 30 can be moved in accordance with a manual operation of the cart positioner operation unit 20. The cart positioner operation unit 20 includes the input 22 and an operation handle 23. The input 22 is configured to accept operation s to move or change orientations of the positioner 30, the arm base 40 and the plurality of robot arms 50 to prepare a surgical operation mainly before the operation is carried out. The medical cart 10 includes the operation handle 23, a stabilizer 24 and an electric cylinder 25 shown in FIG. 17.

Figure 2:
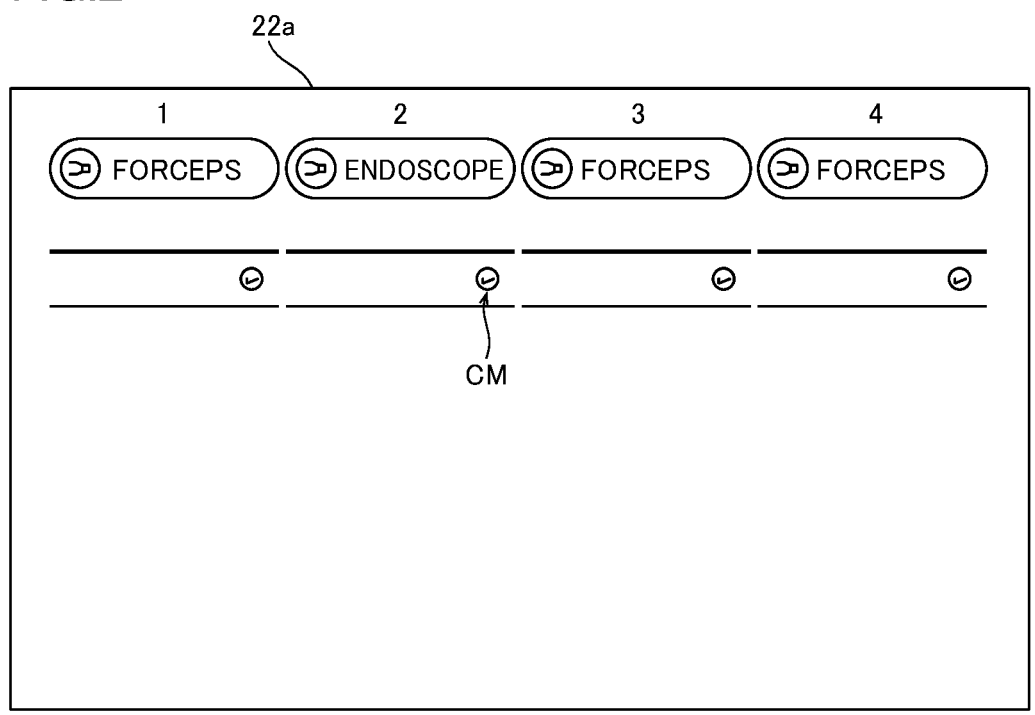
FIG. 2 is a diagram showing a display of a medical cart according to the one embodiment.

As shown in FIG. 3, the input 22 of the medical cart 10 includes the display 22a, a joystick 22b, an enable switch 22c, an error reset button 22d and speakers 22e. For example, the display 22a is a liquid crystal panel. As shown in FIG. 2, the display 22a indicates numbers corresponding to the plurality of robot arms 50. Also, the display 22a indicates types of surgical instruments 1 attached to the plurality of robot arms 50. The display 22a indicates checkmarks CM representing that their pivot positions PP (discussed later) have been set.

As shown in FIG. 3, the joystick 22b is arranged in proximity to the display 22a of the input 22 of the medical cart 10. When an operation mode displayed on the display 22a is selected, the positioner 30 can be three-dimensionally moved by operating the joystick 22b.

The enable switch 22c is arranged in proximity to the joystick 22b of the medical cart 10. The enable switch 22c is configured to enable or disable movement of the positioner 30. When the enable switch 22c is pressed so that movement of the positioner 30 is enabled, the positioner 30 can be moved in accordance with a manual operation of the joystick 22b.

The error reset button 22d is configured to reset an error of the robotic surgical system 500. An exemplary error is an error of abnormal deviation. The speakers 22e are a pair of speakers. The pair of speakers 22e are arranged at a position in the medical cart 10 in proximity to the positioner 30.

Also, the operation handle 23 is arranged in proximity to the display 22a of the medical cart 10. The operating handle 23 includes a throttle grip 23a that is configured to be gripped and twisted by an operator such as nurse, engineer, etc. to control movement of the medical cart 10. Specifically, the operation handle 23 is arranged under the input 22. The medical cart 10 can move forward when the throttle grip 23a is twisted from a near side toward a far side. The medical cart 10 can move backward when the throttle grip 23a is twisted from the far side toward the near side. A speed of the medical cart 10 can be changed in accordance with a twisting amount of the throttle grip 23a. In addition, the operation handle 23 is configured to swing leftward and rightward as shown by an R direction, and to rotate the medical cart 10 depending on the swinging operation of the operation handle 23.

Also, the operation handle 23 of the medical cart 10 includes an enable switch 23b configured to enable or disable movement of the medical cart 10. When the enable switch 23b is pressed so that movement of the medical cart 10 is enabled, the medical cart 10 can be moved in accordance with a manual operation of the throttle grip 23a of the operating handle 23.

For example, as shown in FIG. 1, the positioner 30 is constructed of a 7-axis multi-joint robot. The positioner 30 is arranged on the medical cart 10. The positioner 30 is configured to adjust a position of the arm base 40. The positioner 30 can three-dimensionally move the position of the arm base 40.

The positioner 30 includes a base 31, and a plurality of links 32 coupled to the base 31. The links 32 are coupled to each other by joints 33.

The arm base 40 is attached to a free end of the positioner 30. The base ends of the plurality of robot arms 50 are attached to the arm base 40. The plurality of robot arms 50 are foldable into a storage posture. The arm base 40 and the plurality of robot arms 50 covered by sterile drapes when used. The robot arm 50 is configured to support surgical instruments 1.

Figure 17:
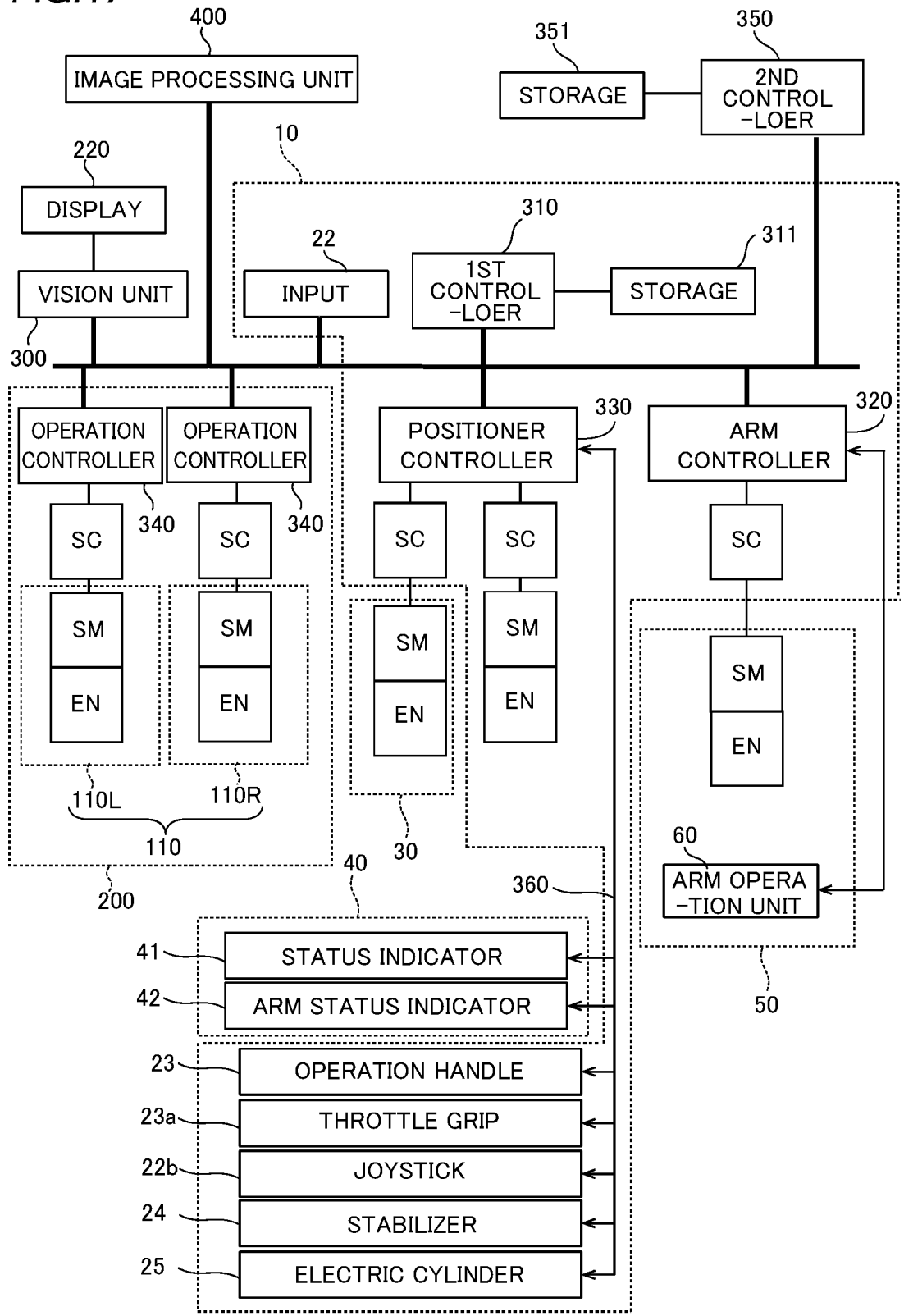
FIG. 17 is a control block diagram of a surgical robot according to the one embodiment.

A status indicator 41 and an arm status indicator 42 shown in FIG. 17 are provided in the arm base 40. The status indicator 41 is configured to indicate a status of robotic surgical system 500. The arm status indicator 42 is configured to indicate states of robot arms 50.

Two or more robot arms 50 are provided as a plurality of robot arms 50. Specifically, four robot arms 50a, 50b, 50c and 50d are provided. The robot arms 50a, 50b, 50c and 50d have a similar configuration to each other.

As shown in FIG. 4, each robot arm 50 includes an arm 51, a first link part 52, a second link part 53, and a translation mechanism 54. The robot arm 50 includes joints JT1, JT2, JT3, JT4, JT5, JT6, JT7 and JT8. The joints JT1, JT2, JT3, JT4, JT5, JT6 and JT7 have A1, A2, A3, A4, A5, A6 and A7 axes as their rotation axes. JT8 has an A8 axis as its linear-motion axis. The axes from A1 to A7 are rotation axes of the joints JT1 to JT7 of the arm 51. The A7 axis is a rotational axis of the first link part 52. The A8 axis is a linear-motion axis along which the second link part 53 is moved relative to the first link part 52 in the Z direction by the translation mechanism 54. The arm 51 includes a base 51a and a link part 51b.

The arm 51 is constructed of a 7-axis multi-joint robot arm. The first link part 52 is arranged in a free end of arm 51. The arm operation unit 60 discussed later is attached to the second link part 53. The translation mechanism 54 is arranged between the first link part 52 and the second link part 53. The second link part 53 includes a holder 55 configured to hold the surgical instrument 1. The translation mechanism 54 is configured to translationally move the holder 55 to which the surgical instrument 1 is attached between a first position and a second position. The first position is a position of a Z2-direction side end of a moving range of the holder 55 moved by the translation mechanism 54 along the A8 axis. The second position is a position of a Z1-direction side end of the moving range of the holder 55 moved by the translation mechanism 54 along the A8 axis.

Figure 9:
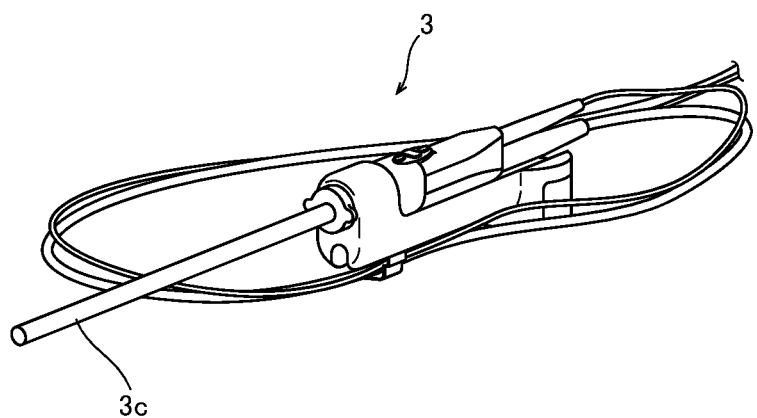
FIG. 9 is a diagram showing an endoscope.
Figure 10:
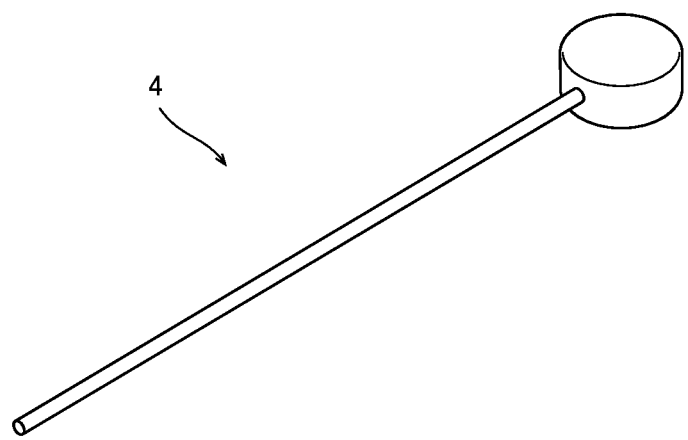
FIG. 10 is a diagram showing a pivot-position setting tool.

Surgical instruments 1 can be attached to the free ends of the plurality of robot arms 50. The surgical instruments 1 include, for example, replaceable instruments, an endoscope 3 (see FIG. 9) configured to capture images of a part to be operated, a pivot-position setting tool 4 (see FIG. 10) to set a pivot position PP described below, etc. The instrument 2 includes a driven unit 2a, a forceps 2b and a shaft 2c.

As shown in FIG. 1, an endoscope 3 is attached to the free end of one, e.g., the robot arm 50c of the robot arms 50, and the instruments 2 are attached to the free ends of the others, e.g., the robot arms 50a, 50b and 50d. The endoscope 3 is preferably attached to one of two robot arms 50b and 50c, which are located in a central part, of the four robot arms 50 arranged adjacent to each other.

(Configuration of Instrument)

Figure 5:
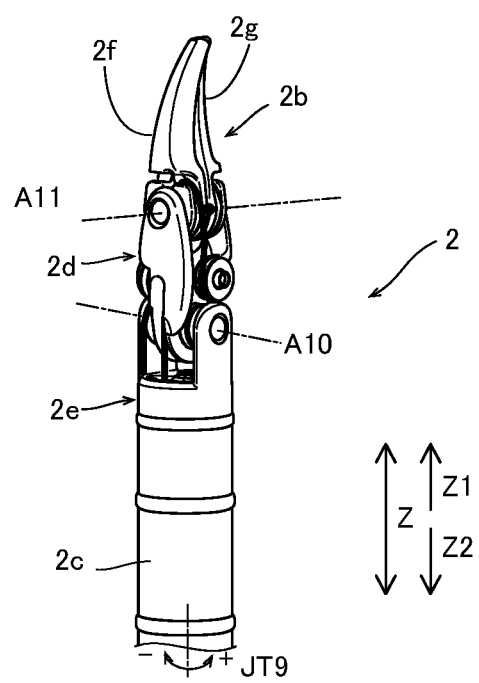
FIG. 5 is a diagram showing a forceps.

For example, as shown in FIG. 5, a forceps 2b is attached to the free end of the instrument 2. Tools that include a joint and can be attached to the free end of the instrument 2 can include scissors, a grasper, a needle holder, a microdissector, a staple applier, a tucker, a vacuum cleaning tool, a snare wire, a clip applier, etc., other than the forceps 2b. Tools that do not include any joint and can be attached to the free end of the instrument 2 can include a cutting blade, a cautery probe, a cleaner, a catheters, a vacuum orifice, etc.

The forceps 2b includes a first support 2d and a second support 2e. The first support 2d is configured to rotatably support a base end side of jaws 2f and 2g about a A11 axis. The second support 2e is rotatably configured to support a base-end side of the first support 2d about a A10 axis. The shaft 2c can rotate about a A9 axis. The jaws 2f and 2g can pivot about the A11 axis to open and close.

(Configuration of Arm Operation Unit)

Figure 6:
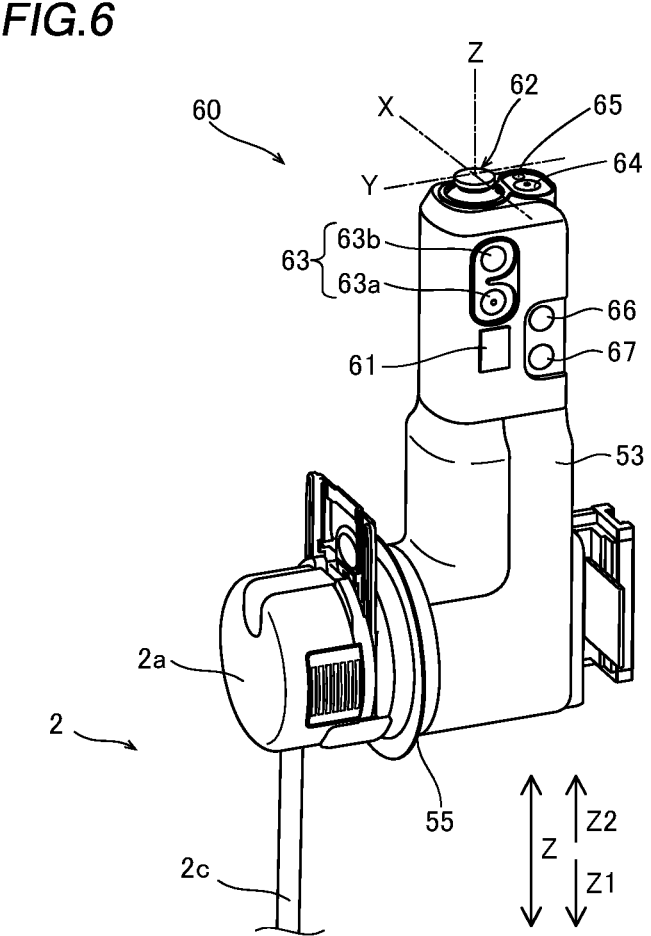
FIG. 6 is a block diagram showing a configuration of an arm operation unit according to the one embodiment.

As shown in FIG. 6, the arm control unit 60 is mounted to the robot arm 50, and is configured to operate the robot arm 50. Specifically, the arm operation unit 60 is mounted to the second link part 53.

The arm control unit 60 include an enable switch 61, a joystick 62, linear switches 63, a mode switching button 64, a mode indicator 65, a pivot button 66, and an adjustment button 67.

The enable switch 61 is configured to enable or disable movement of the robot arm 50 by means of the joystick 62 and the linear switches 63 when pressed, Movement of the surgical instrument 1 by the robot arm 50 is enabled when the enable switch 61 is pressed while the arm operation unit 60 is grasped by an operator such as nurse, assistant, etc.

The joystick 62 is an operation tool configured to control movement of the surgical instrument 1 by the robot arm 50. The joystick 62 is an operation tool configured to control a moving direction and a moving speed of the robot arm 50. The robot arm 50 can be moved in accordance with to a tilting direction and a tilting angle of the joystick 62.

The linear switches 63 are a switch for moving the surgical instrument 1 in the Z direction, which is a longitudinal direction of the instrument 1. The linear switches 63 includes a linear switch 63a for moving the surgical instrument 1 in a direction in which the surgical instrument 1 is inserted into a patient P, and a linear switch 63b for moving the surgical instrument 1 in a direction in which the surgical instrument 1 is moved away from the patient P. The linear switch 63a and the linear switch 63b are constructed of a press-button switch.

Figure 7:
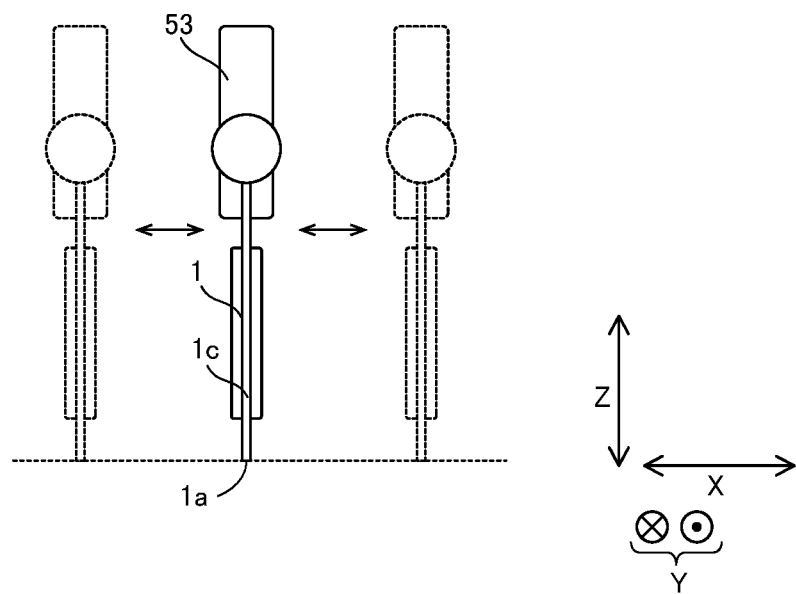
FIG. 7 is a diagram illustrating translational movement of the robot arm.
Figure 8:
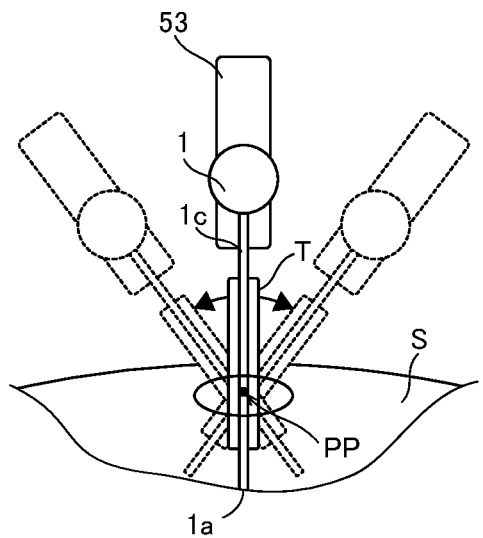
FIG. 8 is a diagram illustrating rotational movement of the robot arm.

The mode switching button 64 is a press-button switch for switching between a translation mode in which the surgical instrument 1 is translationally moved, and a rotation mode in which the surgical instrument 1 is rotated. As shown in FIG. 7, in the translation mode in which the robot arm 50 is translationally moved, the robot arm 50 can be moved so that the free end 1a of the surgical instrument 1 can be moved in an X-Y plane. As shown in FIG. 8, in the rotation mode in which the robot arm 50 is rotated, in a case in which any pivot position PP is not stored in the storage 351, the robot arm 50 can be moved so that the forceps 2b can be rotated about a center of the forceps 2b of the instrument 2 as surgical instrument 1, and in a case in which a pivot position PP is stored in the storage 351, the robot arm 50 can be moved so that the forceps 2b can be rotated about a center of the forceps 2b on the A11 axis. In this case, the surgical instrument 1 is rotated with the shaft 1c of the surgical instrument 1 being inserted into a trocar T. The mode switching button 64 is arranged on a surface on a Z-direction side of the arm operation unit 60.

The mode indicator 65 is configured to indicate which mode is selected. The mode indicator 65 is configured to light on to indicate the rotation mode, and to light off indicate the translation mode. The mode indicator 65 also serves as a pivot position indicator to indicate that the pivot position PP is set. The mode indicator 65 is arranged on the surface on the Z-direction side of the arm operation unit 60.

The pivot button 66 is a press-button switch configured to set the pivot position PP, which corresponds to the rotation axis of the surgical instrument 1 attached to the robot arm 50.

The adjustment button 67 is a button configured to optimize a position of the robot arm 50. After the pivot position PP is set with respect to the robot arm 50 to which the endoscope 3 is attached, when the adjustment button 67 is pressed positions of the other robot arms 50 and the arm base 40 is optimized. The adjustment button 67 is a button different from the enable switch 61.

(Remote Control Apparatus)

For example, as shown in FIG. 1, the remote control apparatus 200 is arranged in an operating room or outside the operating room. The remote control apparatus 200 includes operation units 110, foot pedals 120, a touch panel 130, a monitor 140, a support arm 150, a support bar 160, and an error reset button 161. The operation units 110 serves as a handle for operation that is configured to receive commands from an operator such as doctor. The monitor 140 is an example of a display.

(Operation Unit)

Figure 11:
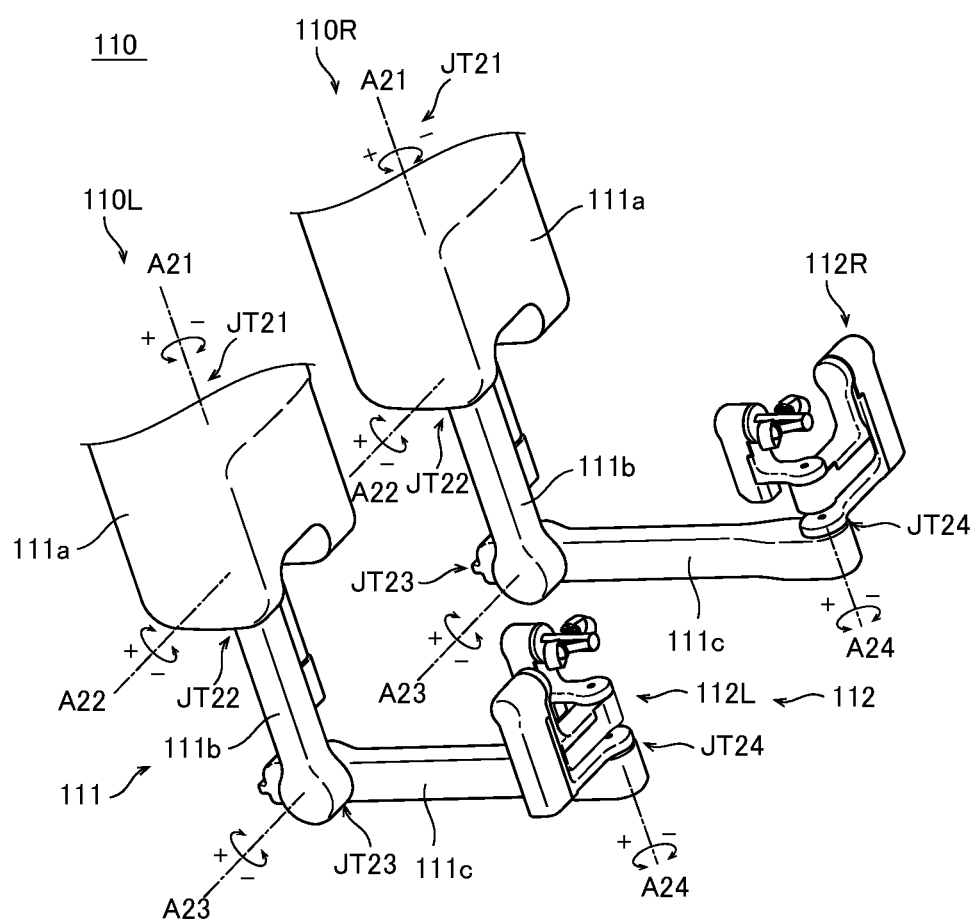
FIG. 11 is a diagram showing operations unit according to the one embodiment.

As shown in FIG. 11, the operation units 110 are handle configured to manipulate the surgical instrument 1. Also, the operation units 110 are configured to receive operations as to the surgical instruments 1. The operation units 110 include an operation unit 110L that is arranged on a left side from viewpoint of an operator such as doctor and is configured to be manually operated by a left hand of an operator, and an operation unit 110R that is arranged on a right side from viewpoint of the operator such as doctor and is configured to be manually operated by a right hand of the operator. The operation units 110 include arms 111 and wrist parts 112. The operation unit 110R includes an arm 111R and a wrist part 112R. The operation unit 110L includes an arm 111L and a wrist part 112L. The operation unit 110R and the operation unit 110L are an example of a first operation unit and an example of a second operation unit.

Figure 12:
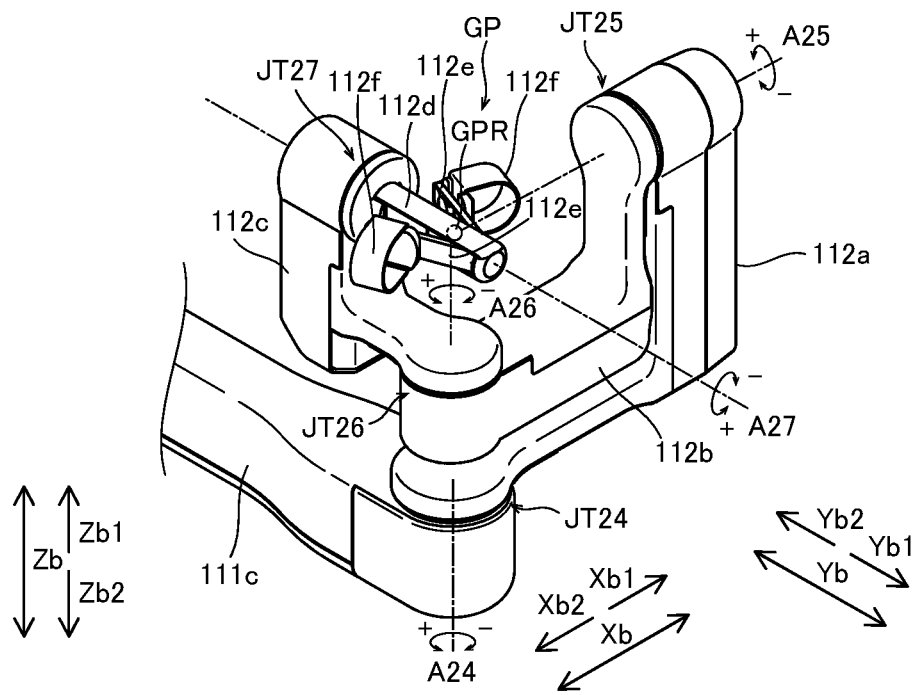
FIG. 12 is a diagram showing a right-hand side wrist part according to the one embodiment.
Figure 13:
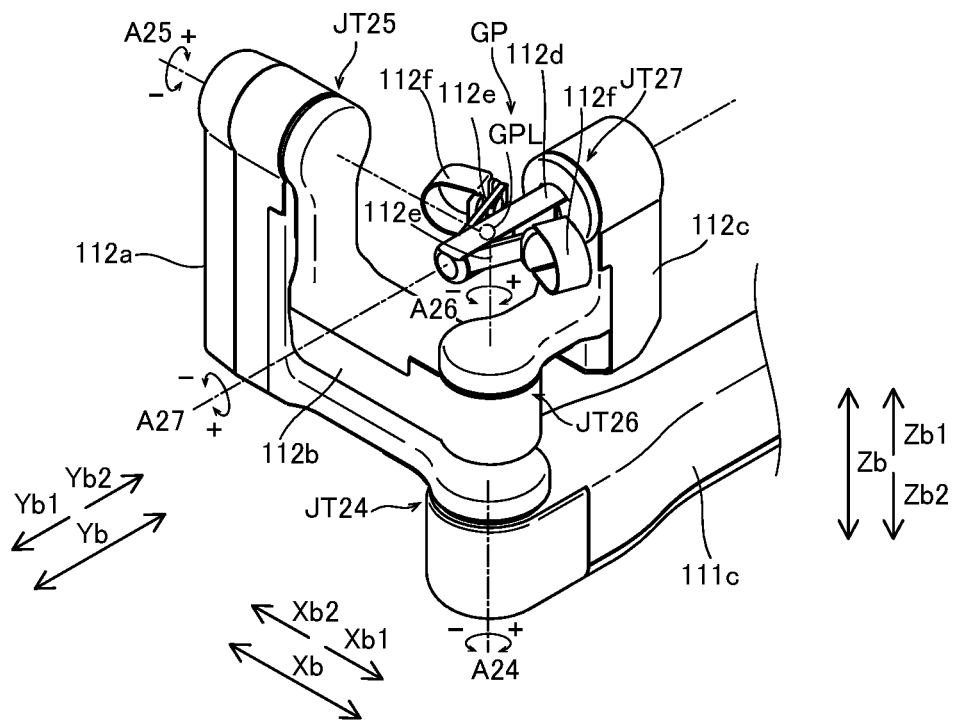
FIG. 13 is a diagram showing a left-hand side wrist part according to the one embodiment.

As shown in FIGS. 11, 12 and 13, the operation unit 110 includes joints JT21, JT22, JT23, JT24, JT25, JT26 and JT27. A21, A22, A23, A24, A25, A26 and A27 axes are rotation axes of the Joints JT21, JT22, JT23, JT24, JT25, JT26 and JT27.

(Arm)

The arm 111 includes a link part 111a, a link part 111b and a link part 111c. An upper end side of the link part 111a is attached to the remote control apparatus 200 pivotably about the A21 rotation axis extending in a vertical direction. An upper end side of the link part 111b is attached to a lower part of the link part 111a pivotably about the A22 rotation axis extending in a horizontal direction. One end side of the link part 111c is attached to a lower part of the link part 111b pivotably about the A23 rotation axis extending in a horizontal direction. The wrist part 112 is attached to another end side of the link part 111c pivotably about the A24 rotation axis. The link part 111a is connected to the remote control apparatus 200 by the joint JT21. The link part 111a is connected to the link part 111b by the joint JT22. The link part 111b is connected to the link part 111c by the joint JT23. The arm 111 supports the wrist part 112.

The wrist parts 112 include a wrist part 112R shown in FIG. 12 operated by an the right hand of the operator, and a wrist part 112L shown in FIG. 13 operated by the left hand of the operator. A reference posture of the operation unit 110R is shown in FIG. 12, a reference posture of the operation unit 110L is shown in FIG. 13. A configuration of the wrist part 112R is similar to the wrist part 112L.

The wrist part 112 includes a link part 112a, a link part 112b, a link part 112c, and a grip part 112d configured to be operated by an operator (e.g., a doctor). The link part 112a can pivot about an A24 axis. The link part 112b is attached to the link part 112a pivotably about an A25 rotation axis. The link part 112c is attached to the link part 112b pivotably about an A26 rotation axis. The grip part 112d is attached to the link part 112c pivotably about an A27 rotation axis. The link part 112a, the link part 112b and the link part 112c have an L shape.

Each wrist part 112 includes a pair of grip members 112e configured to be opened and closed by the operator. The grip member 112e is formed of a thin plate-shaped lever, and near-side ends of the pair of grip members 112e are rotatably coupled to a near-side end of the grip part 112d. The grip members 112e include cylindrical finger insertion sections 112f. The operator can insert his or her fingers into the finger insertion sections 112f, and operate the wrist part 112. Base-side ends of the pair of grip member 112e are coupled to the grip part 112d so that
opening angle between the Jaw 2f and the jaw 2g can be changed by increasing/decreasing an angle between the pair of grip members 112e. One of the grip members 112e includes a magnet, while the grip part 112d includes a Hall sensor. The magnet and the Hall sensor function as an angle detection sensor, and can provide an opening angle when the operator opens/closes the grip members 112e. One of the grip members 112e may include a Hall sensor, while the grip part 112d may include a magnet so that they form the angle detection sensor. Also, both the grip members 112e may include a magnet or a Hall sensor as a part of the angle detection sensor.

An intersection between rotation axes of operation unit 110 is referred to as gimbal point GP. Specifically, the gimbal point GP is an intersection between the A24 axis, the A25 axis, the A26 axis and the A27 axis. The gimbal point GP is positioned in the grip part 112d to which the pair of grip members 112e are attached. Each of the operation unit 110L and the operation unit 110R has the gimbal point GP. A gimbal point of the operation unit 110R is defined as GPR. A gimbal point of the operation unit 110L is defined as GPL. The gimbal point GPL and the GPR gimbal point are an example of a first gimbal point and an example of the second gimbal point, respectively.

In the reference posture, the A24 axis and the A26 axis of the operation unit 110 extend in the Zb direction. The A25 axis extends in the Xb direction. The A27 axis extends in the Yb direction. As shown in FIG. 12, in the reference posture, the link part 112a and the link part 112b of the wrist part 112R arranged in an Xb-Zb plane, and is located on an Xb1 side with respect to the A27 axis. In the reference posture, the link part 112c arranged in an Yb-Zb plane. In the reference posture, the grip part 112d extend in the A27 axis.

As shown in FIG. 13, in the reference posture, the link part 112a and the link part 112b of the wrist part 112L arranged in an Xb-Zb plane, and is located on an Xb2 side with respect to the A27 axis. In the reference posture, the link part 112c arranged in an Yb-Zb plane. In the reference posture, the grip part 112d extend in the A27 axis.

Figure 14:
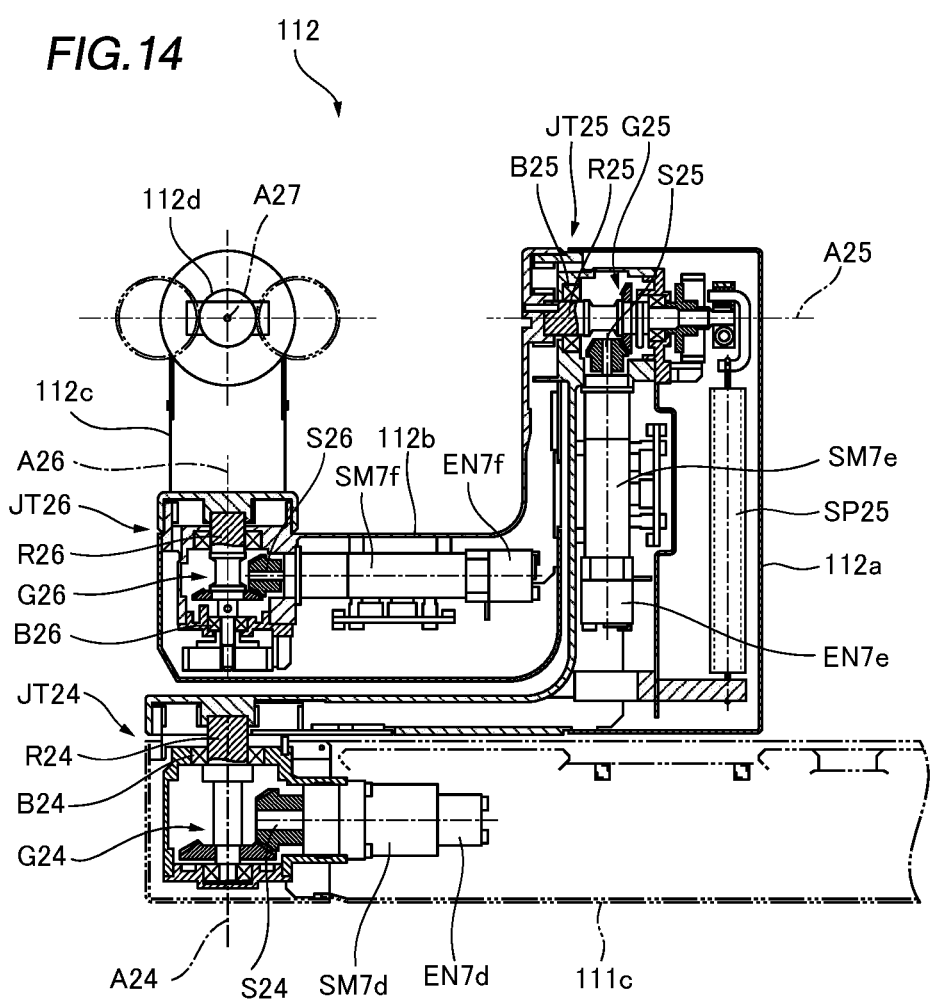
FIG. 14 is a cross-sectional diagram of the wrist part taken along a plane including an A25 axis and an A26 axis.

As shown in FIG. 14, the link part 112a has an elbow-shaped (L-shaped) box body, and accommodates main elements of the link part 112a in the box body. A rotation axis R24 is positioned in an end part of the link part 112a. The rotation axis R24 is held in another end part of the link part 111c by a bearing B24 pivotably about the A24 axis. The Joint JT24 is constructed of the rotation axis R24 and the bearing B24. Accordingly, the link part 112a can pivot about the rotation axis A24 with respect to the link part 111c.

A servomotor SM7d is arranged in the link part 111c so that a center axis of a main shaft S24 is orthogonal to the A24 axis. The encoder EN7d for detecting a rotation angle of the servomotor SM7d is arranged in the servomotor SM7d. Any encoder that can detect the rotation angle can be used as the encoder EN7d, or a rotation meter, etc. may be used instead of the encoder EN7d. The encoder EN7d is directly coupled to the main shaft S24 of the servomotor SM7d. The main shaft S24 of the servomotor SM7d is coupled to the rotation axis R24 through a bevel gear mechanism G24. Accordingly, the encoder EN7d can detect a rotation angle of the servomotor SM7d when the link part 112a rotates, and the rotation axis R24 can be rotatably driven by the servomotor SM7d.

The link part 112b has an elbow-shaped (L-shaped) box body, and accommodates main elements of the link part 112b in the box body. A rotation axis R25 is positioned in an end part of the link part 112b. The rotation axis R25 is held in another end part of the link part 112a by a bearing B25 pivotably about the A25 axis. The Joint JT25 is constructed of the rotation axis R25 and the bearing B25. Accordingly, the link part 112b can pivot about the rotation axis A25 with respect to the link part 112a.

A servomotor SM7e is arranged in the link part 112a so that a center axis of a main shaft S25 is orthogonal to the A25 axis. The encoder EN7e for detecting a rotation angle of the servomotor SM7e is arranged in the servomotor SM7e. A rotation meter, etc. may be used instead of the encoder EN7e. The encoder EN7e is directly coupled to the main shaft S25 of the servomotor SM7e. The main shaft S25 of the servomotor SM7e is coupled to the rotation axis R25 through a bevel gear mechanism G25. Accordingly, the encoder EN7e can detect a rotation angle of the servomotor SM7e when the link part 112b rotates, and the rotation axis R25 can be rotatably driven by the servomotor SM7e.

A compression coil spring SP25 is arranged between a predetermined part of the link part 112a and the rotation axis R25. For example, the predetermined part is a lower end part of a rear end part of the link part 112a in the reference posture of the wrist part 112. The compression coil spring SP25 is arranged with its center axis being in parallel to the A24 axis and orthogonal to the A25 axis. Also, the compression coil spring SP25 is designed so that a predetermined torque is applied to the link part 112b in a rotating direction when the link part 112b pivots from the reference posture of the wrist part 112. The predetermined torque is specified to partially cancel a gravity torque applied to the rotation axis R25 by a self weight of parts of the wrist part 112 that include the link part 112b and parts on a front side with respect to the link part 112b. Accordingly, a part of the gravity torque applied to the rotation axis R25 is canceled by the compression coil spring SP25.

Figure 15:
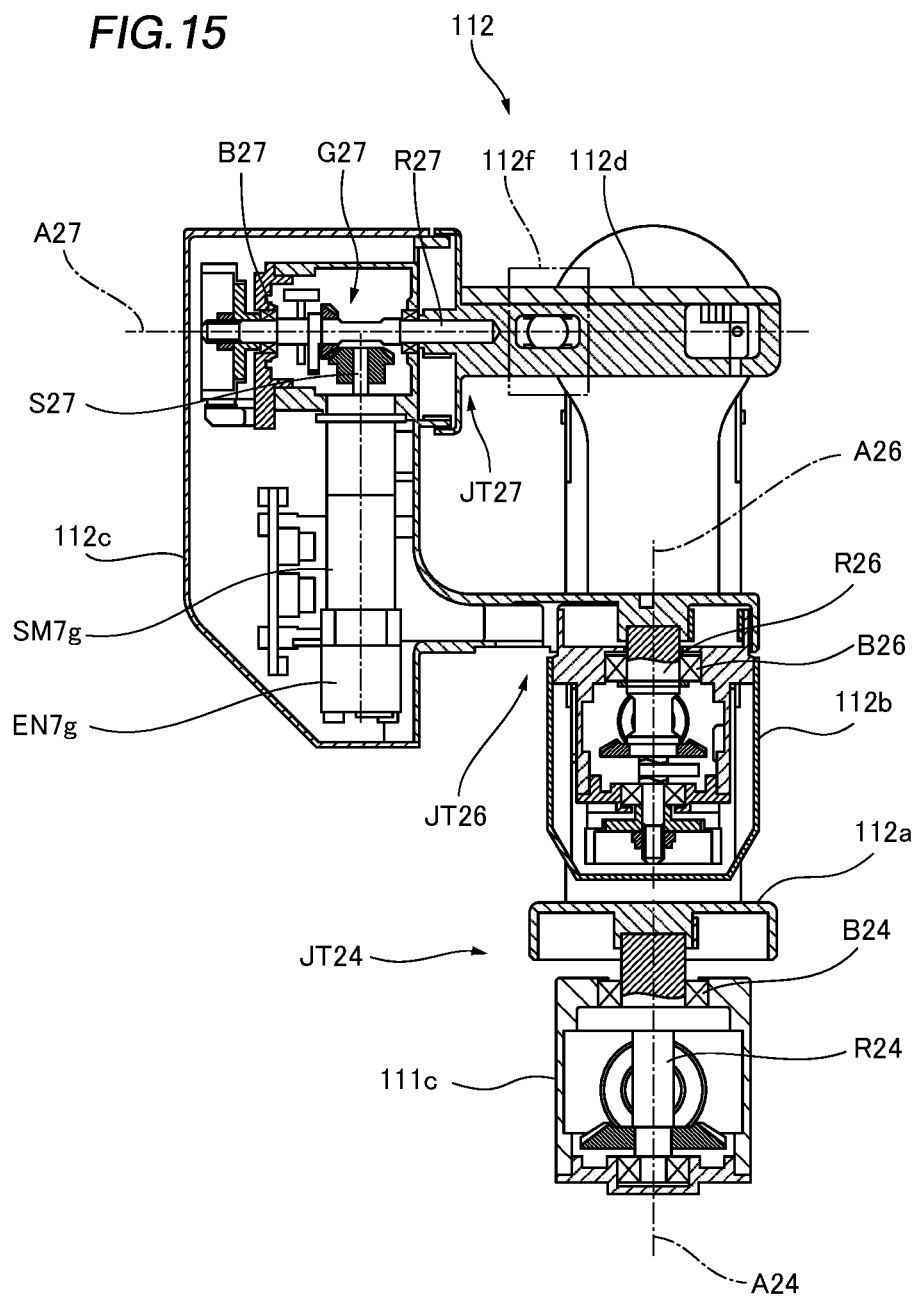
FIG. 15 is a cross-sectional diagram of the wrist part taken along a plane including an A26 axis and an A27 axis.

As shown in FIGS. 14 and 15, the link part 112c has an elbow-shaped (L-shaped) box body, and accommodates main elements of the link part 112c in the box body. A rotation axis R26 is positioned in an end part of the link part 112c. The rotation axis R26 is held in another end part of the link part 112b by a bearing B26 pivotably about the A26 axis. The Joint JT26 is constructed of the rotation axis R26 and the bearing B26. Accordingly, the link part 112c can pivot about the rotation axis A26 with respect to the link part 112b.

A servomotor SM7f is arranged in the link part 112b so that a center axis of a main shaft S26 is orthogonal to the A26 axis. The encoder EN7f for detecting a rotation angle of the servomotor SM7f is arranged in the servomotor SM7f. A rotation meter, etc. may be used instead of the encoder EN7f. The encoder EN7f is directly coupled to the main shaft S26 of the servomotor SM7f. The main shaft S26 of the servomotor SM7f is coupled to the rotation axis R26 through a bevel gear mechanism G26. Accordingly, the encoder EN7f can detect a rotation angle of the servomotor SM7f when the link part 112c rotates, and the rotation axis R26 can be rotatably driven by the servomotor SM7f.

As shown in FIG. 15, a rotation axis R27 is positioned in an end part of the grip part 112d. The rotation axis R27 is held in another end part of the link part 112c by a bearing B27 pivotably about the A27 axis. The Joint JT27 is constructed of the rotation axis R27 and the bearing B27. Accordingly, the grip part 112d can pivot about the rotation axis A27 with respect to the link part 112c.

A servomotor SM7g is arranged in the link part 112c so that a center axis of a main shaft S27 is orthogonal to the A27 axis. The encoder EN7g for detecting a rotation angle of the servomotor SM7g is arranged in the servomotor SM7g. A rotation meter, etc. may be used instead of the encoder EN7g. The encoder EN7g is directly coupled to the main shaft S27 of the servomotor SM7g. The main shaft S27 of the servomotor SM7g is coupled to the rotation axis R27 through a bevel gear mechanism G27. Accordingly, the encoder EN7g can detect a rotation angle of the servomotor SM7g when the grip part 112d rotates, and the rotation axis R27 can be rotatably driven by the servomotor SM7g.

The monitor 140 is a scope-type display device configured to display images captured by the endoscope 3. The monitor 140 includes an information producer 141. The information producer 141 is configured to produce an error sound. The support arm 150 supports the monitor 140, and can adjust a height of the monitor 140 to a height of eyes of the operator such as doctor. The touch panel 130 is arranged on the support bar 160. When a head of the operator is detected by a sensor arranged in proximity to the monitor 140, the surgical robot 100 can accept manual operations from the remote control apparatus 200. The operator will manually operate the operation unit 110 and the foot pedals 120 while seeing of an affected area on the monitor 140. Commands can be provided to the remote control apparatus 200 in accordance with these manual operations. Instructions provided to the remote control apparatus 200 are transmitted to the surgical robot 100.

The error reset button 161 is arranged on the support bar 160. The error reset button 161 is configured to reset an error of the robotic surgical system 500. An exemplary error is an error of abnormal deviation.

(Foot Pedal)

Figure 16:
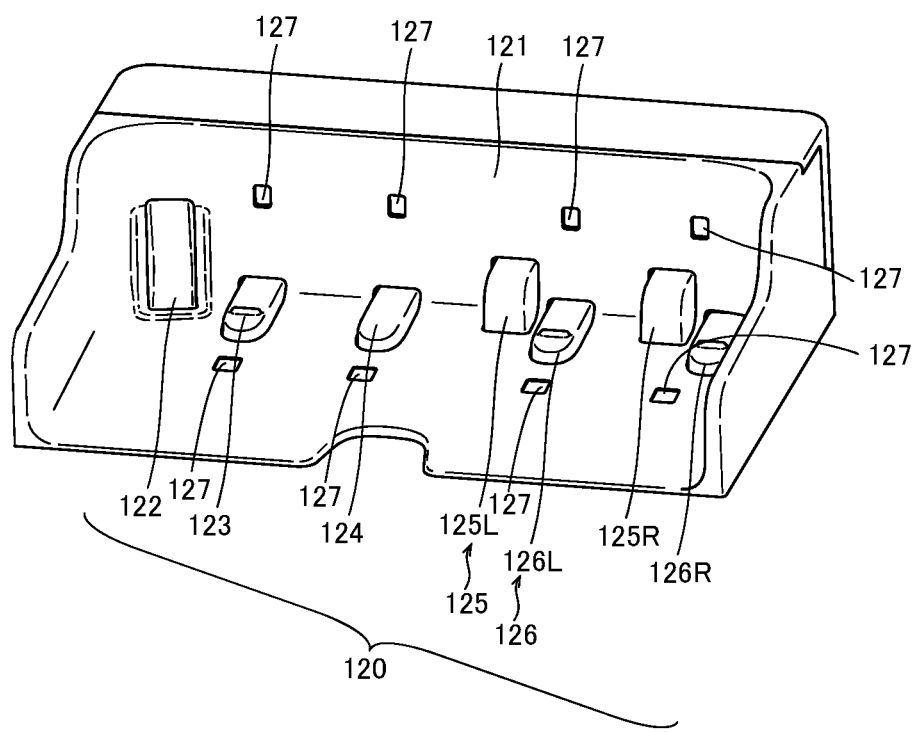
FIG. 16 is a perspective diagram showing a foot pedal according to the one embodiment.

As shown in FIG. 16, a plurality of foot pedals 120 configured to activate functions of the surgical instruments 1. The plurality of foot pedals 120 are provided in a base 121. The foot pedals 120 include a switching pedal 122, a clutch pedal 123, a camera pedal 124, incision pedals 125, coagulation pedals 126, and foot detectors 127. The switching pedal 122, the clutch pedal 123, the camera pedal 124, the incision pedals 125, the coagulation pedals 126 are configured to be operated by an operator's foot. Also, the incision pedals 125 include an incision pedal 125R corresponding to a right-side robot arm 50 and an incision pedal 125L corresponding to a left-side robot arm 50. Also, the coagulation pedals 126 include a coagulation pedal 126R corresponding to a right-side robot arm 50 and a coagulation pedal 126L corresponding to a left-side robot arm 50. The camera pedal 124 is an example of an input.

The switching pedal 122 is configured to switch between the robot arms 50 to be operated by the operation unit 110. The clutch pedal 123 is configured to activate a clutch function of temporally halting operation connection between the robot arm 50 and the operation unit 110. While the clutch pedal 123 is pressed by the operator, operations provided by the operation unit 110 is not transmitted to the robot arm 50. While the camera pedal 124 is pressed by the operator, the robot arm 50 that holds the endoscope 3 can be operated through the operation unit 110. While the incision pedal 125 or the coagulation pedal 126 is pressed, an electric surgical apparatus is active.

The foot detectors 127 are configured to detect the operator's foot that operates the foot pedal 120. The foot detector 127 are arranged corresponding to the switching pedal 122, the clutch pedal 123, the camera pedal 124, the incision pedal 125L, the coagulation pedal 126L, the incision pedal 125R and the coagulation pedal 126R to detect a foot that hovers above their corresponding foot pedal 120. The Foot detectors 127 are arranged on the base 121. Functions of the foot pedals 120 including the camera pedal 124 are not limited to operations through a pedal configured to be pressed by an operator's foot as discussed in this embodiment, and inputs such as hand switches may be provided in the operation unit 110 to be manually operated by an operator's hand instead of the foot pedals, for example.

(Vision Unit and Image Processing Unit)

As shown in FIG. 1, a cart 210 holds a vision unit 300 and an image processing unit 400. The image processing unit 400 is configured to process images captured by the endoscope 3. A display 220 is arranged on the cart 210. The display 220 is configured to display images captured by the endoscope 3. An error reset button 230 and an information portion 240 are arranged on a vision unit 300. The error reset button 230 is configured to reset an error of the robotic surgical system 500. An exemplary error is an error of abnormal deviation. The information producer 240 is configured to produce an error sound.

(Configuration of Control System)

As shown in FIG. 17, the robotic surgical system 500 includes a first controller 310, an arm controller 320, a positioner controller 330, operation controllers 340 and a second controller 350. In addition, the robotic surgical system 500 includes a storage 311 connected to the first controller 310, and a storage 351 connected to the second controller 350. The first controller 310 is an example of a controller.

The first controller 310 is accommodated in the medical cart 10, and configured to communicate with the arm controller 320 and the positioner controller 330 so that the robotic surgical system 500 is entirely controlled. Specifically, the first controller 310 is configured to control the arm controller 320, the positioner controller 330 and the operation controllers 340 by using the communications with them. The first controller 310 is connected to the arm controller 320, the positioner controller 330 and the operation controllers 340 through LAN, etc. The first controller 310 is arranged in the medical cart 10.

Each of the plurality of robot arms 50 includes the arm controller 320. In other words, a plurality of arm controllers 320 the number of which corresponds to the number of the plurality of robot arms 50 are included in the medical cart 10.

As shown in FIG. 17, the input 22 is connected to the first controller 310 through LAN, etc. The status indicator 41, the arm status indicator 42, the operation handle 23, the throttle grip 23a, the joystick 22b, the stabilizer 24 and the electric cylinder 25 are connected to the positioner controller 330 through a wiring line 360 by means of a communication network that can share information with them by using serial communication. Although all of these status indicator 41, arm status indicator 42, etc. are connected to each other through one wiring line 360 in FIG. 17, wiring lines 360 are actually provided to each of the status indicator 41, the arm status indicator 42, the operation handle 23, the throttle grip 23a, the joystick 22b, the stabilizer 24 and the electric cylinder 25.

Figure 18:
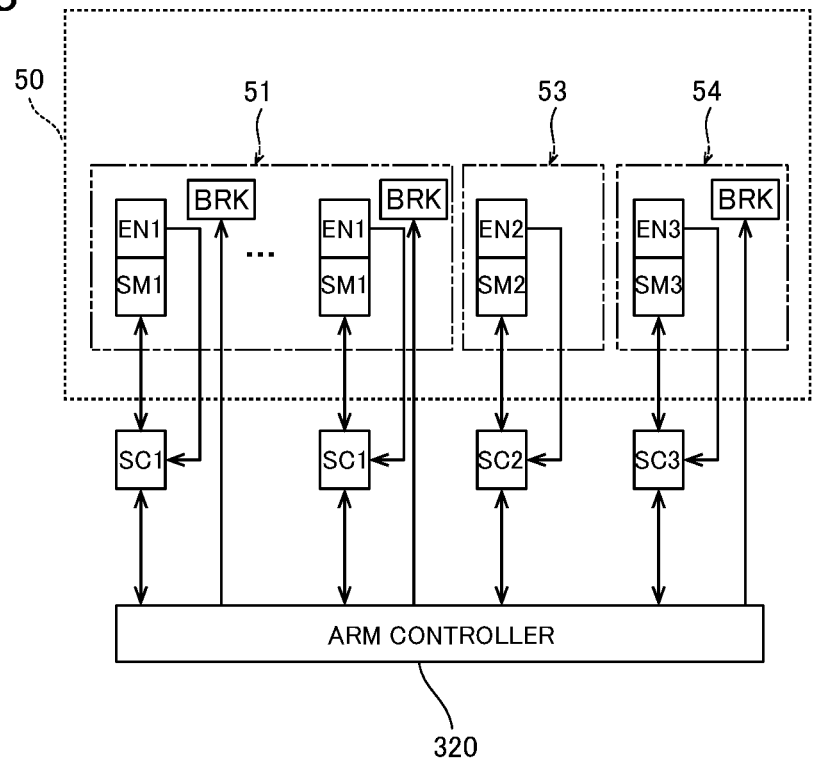
FIG. 18 is a control block diagram of the robot arm according to the one embodiment.

As shown in FIG. 18, each arm 51 includes a plurality of servomotors SM1, a plurality of encoders EN1 and a plurality of speed reducers corresponding to the Joints JT1, JT2, JT3, JT4, JT5, JT6 and JT7. The encoder EN1 is configured to detect a rotation angle of the servomotor SM1. The speed reducer is configured to reduce a rotation of the servomotor SM1 whereby increasing its torque. A servo controller SC1 is configured to control the servomotor SM1, and is arranged in the medical cart 10 adjacent to the arm controller 320. Also, the encoder EN1 is configured to detect the rotation angle of the servomotor SM1, and is electrically connected to the servo controller SC1.

The second link part 53 includes a servomotor SM2 configured to rotate a driven member arranged in a driven unit 2a of the surgical instrument 1, an encoder EN2, and a speed reducer. The encoder EN2 is configured to detect a rotation angle of the servomotor SM2. The speed reducer is configured to reduce a rotation of the servomotor SM2 whereby increasing its torque. The medical cart 10 includes a servo controller SC2 configured to control the servomotor SM2 for driving the surgical instrument 1. The encoder EN2 for detecting the rotation angle of the servo motor SM2 is electrically connected to the servo control unit SC2. Note that a plurality of servomotors SM2, a plurality of encoders EN2 and a plurality of servo controllers SC2 are included.

The translation mechanism 54 includes a servomotor SM3 configured to translationally move the surgical instrument 1, an encoder EN3, and a speed reducer. The encoder EN3 is configured to detect a rotation angle of the servomotor SM3. The speed reducer is configured to reduce a rotation of the servomotor SM3 whereby increasing its torque. The medical cart 10 includes a servo controller SC3 configured to control the servomotor SM3 for translationally moving the surgical instrument 1. The encoder EN3 for detecting the rotation angle of the servo motor SM3 is electrically connected to the servo control unit SC3.

The first controller 310 is configured to generate instruction values that specify positions of the servomotor SM1, SM2 and SM3 in accordance with manual operation that is received by the remote control apparatus 200, and to drive the servomotor SM1, SM2 and SM3 in accordance with the instruction values. If any of differences between instruction values and positions of servomotor SM1, SM2 and SM3 detected by sensors becomes greater than an allowable range, the first controller 310 determines an error of abnormal deviation.

Figure 19:
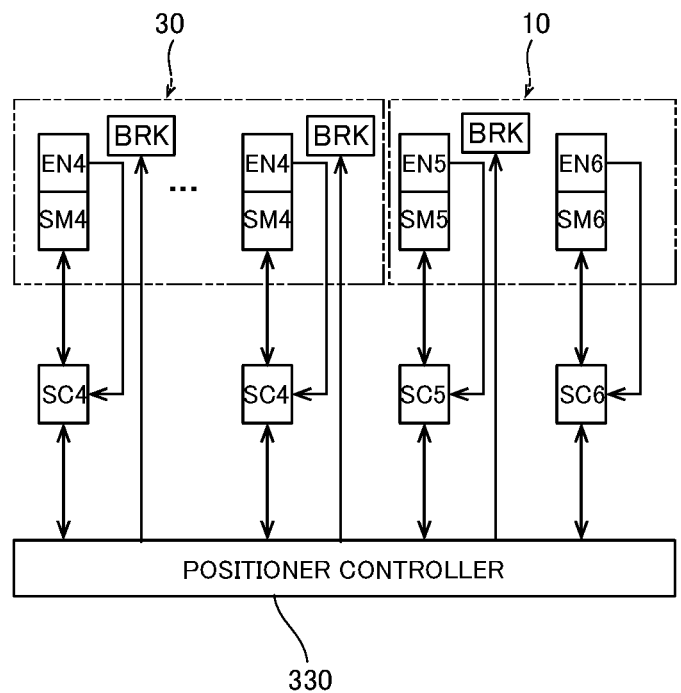
FIG. 19 is a control block diagram of a positioner and the medical cart according to the one embodiment.

As shown in FIG. 19, the positioner 30 includes a plurality of servomotors SM4, a plurality of encoders EN4 and a plurality of speed reducers corresponding to a plurality of joints 33 of the positioner 30. Each encoder EN4 is configured to detect a rotation angle of the servomotor SM4. The speed reducer is configured to reduce a rotation of the servomotor SM4 whereby increasing its torque.

The medical cart 10 includes wheels including front wheels as driving wheels, and rear wheels configured to be steered by manually operating the handle 23. The rear wheels are arranged closer to the operating handle 23 with respect to the front wheels. The medical cart 10 includes a servomotor SM5 configured to drive the front wheels of the medical cart 10, an encoder EN5, speed reducers, and brakes BRK. The speed reducer is configured to reduce a rotation of the servomotor SM5 whereby increasing its torque. Also, the operation handle 23 of the medical cart 10 includes a potentiometer P1 shown in FIG. 3, and the servomotor SM5 of the front wheels can be driven in accordance with a rotation angle detected by the potentiometer P1 in response to a twisting amount of the throttle grip 23a. The rear wheels of the medical cart 10 have a twin-wheel type structure, and the rear wheels can be steered in accordance with a rightward/leftward turn of the operating handle 23. Also, the operation handle 23 of the medical cart 10 includes a potentiometer P2 shown in FIG. 3 on a turning shaft, and the rear wheel of medical cart 10 is provided with a servomotor SM6, an encoder EN6, and speed reducers. The speed reducer is configured to reduce a rotation of the servomotor SM6 whereby increasing its torque. The servomotor SM6 can be driven in accordance with a rotation angle detected by the potentiometer P2 in response to a rightward/leftward turning amount of the operation handle 23. In other words, power is assisted by the servomotor SM6 when the rear wheels are steered by turning the operation handle 23 rightward or leftward.

The medical cart 10 can be moved forward or rearward by driving the front wheels. Also, the medical cart 10 can be turned rightward or leftward by steering the rear wheels by turning the operating handle 23 of the medical cart 10.

As shown in FIG. 19, the medical cart 10 includes servo controllers SC4 configured to control the servomotors SM4 for moving the positioner 30. Also, the encoder EN4 is configured to detect the rotation angle of the servomotor SM4, and is electrically connected to the servo controller SC4. The medical cart 10 includes a servo controller SC5 configured to control the servomotor SM5 for driving the front wheels of the medical cart 10. The encoder EN5 for detecting the rotation angle of the servo motor SM5 is electrically connected to the servo control unit SC5. The medical cart 10 includes a servo controller SC6 configured to control the servomotor SM6 for power assistance to steering of the rear wheels of the medical cart 10. The encoder EN6 for detecting the rotation angle of the servo motor SM6 is electrically connected to the servo control unit SC6.

As shown in FIGS. 18 and 19, the Joints JT1, JT2, JT3, JT4, JT5, JT6 and JT7 of the arm 51, and the joints 33 of the positioner 30 includes their brake BRK. Also, the front wheels of the medical cart 10, the arm base 40 and the translation mechanism 54 includes their brake BRK. The arm controller 320 is configured to one-directionally transmit control signals to the brakes BRK of the Joints JT1, JT2, JT3, JT4, JT5, JT6 and JT7 of the arm 51, and the translation mechanism 54. The control signals are configured to indicate on/off of the brakes BRK. The signals indicating on of the brakes BRK include a signal that instructs the brake BRK to keep activating. The control signals transmitted from the positioner controller 330 to the brakes BRK included in the joints 33 of the positioner 30 and the arm base 40 are configured similar to the control signals transmitted from the arm controller. On startup, all the brakes BRK of the arm base 40, the arm 51 and the translation mechanism 54 are turned off but the servomotors SM are driven to keep postures of the robot arm 50 and the arm base 40 against gravity. If an error occurs in the robotic surgical system 500, the brakes BRK included in the arm base 40, the arm 51 and the translation mechanism 54 are turned on. When the error in the robotic surgical system 500 is reset, the brakes BRK included in the arm base 40, the arm 51 and the translation mechanism 54 are turned off. When shutdown operation is performed in the robotic surgical system 500 is reset, the brakes BRK included in the arm base 40, the arm 51 and the translation mechanism 54 are turned on. The brakes BRK of the front wheels of the medical cart 10 are constantly turned on, and the brakes BRK are deactivated only when the enable switch 23b of the medical cart 10 is kept pressed. Also, the brakes BRK of the joints 33 of the positioner 30 are constantly turned on, and the brakes BRK are deactivated only when the enable switch 22c of the medical cart 10 is kept pressed.

Figure 20:
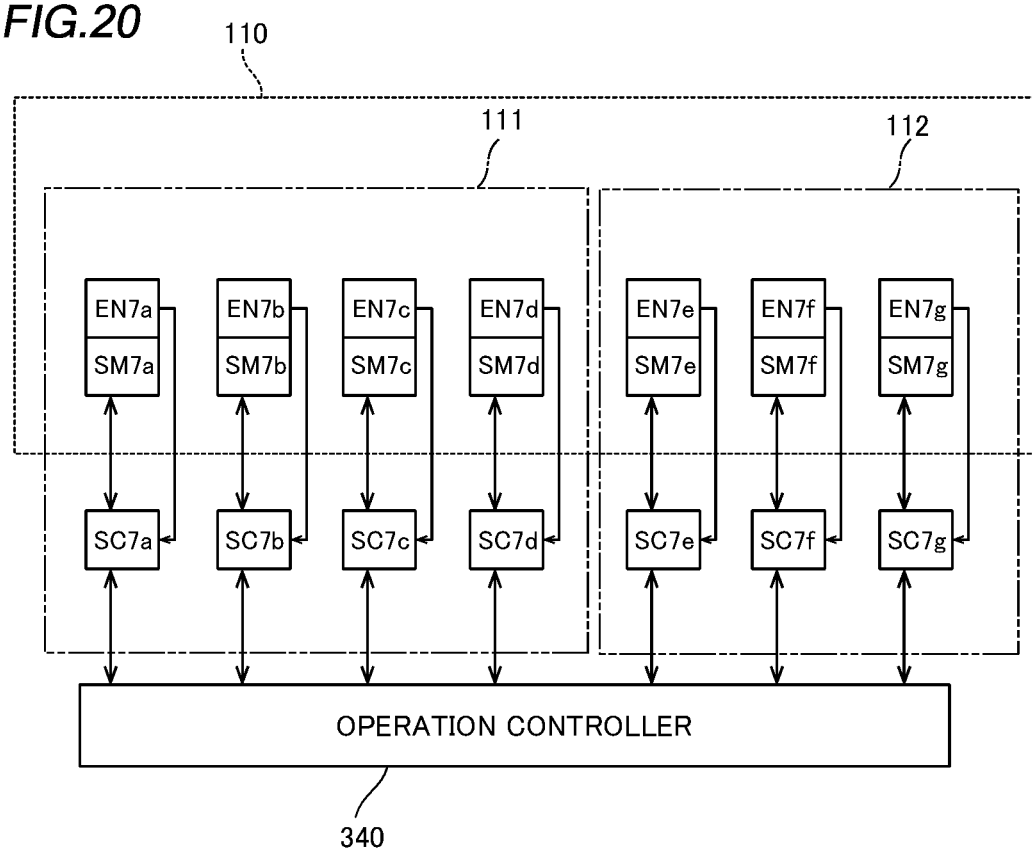
FIG. 20 is a control block diagram of the operation unit according to the one embodiment.

As shown in FIG. 20, the Joints JT21, JT22, JT23, JT24, JT25, JT26 and JT27 of the operation unit 110 includes servomotors SM7a, SM7b, SM7c, SM7d, SM7e, SM7f and SM7g, respectively. Also, servo controllers SC7a, SC7b, SC7c, SC7d, SC7e, SC7f and SC7g configured to control the servomotors are provided. Encoder EN7a, EN7b, EN7c, EN7d, EN7e, EN7f and EN7g for detecting rotation angles of the servomotors are electrically connected to the servo controllers. Each of the operation unit 110L and the operation unit 110R includes the servomotors, the servo controllers and the encoders. The servomotors SM7a, SM7b and SM7c included in the arm 111R of the operation unit 110R are examples of a first driver. The servomotors SM7a, SM7b and SM7c included in the arm 111L of the operation unit 110L are examples of a second driver.

The first controller 310 is configured to control the servomotors through the operation controllers 340 so that torques are produced to cancel out gravitational torques applied to the rotation axes of the servomotors in postures of the operation units 110. Accordingly, the operator can manually operate the operation units 110 by relatively small forces.

The first controller 310 is configured to control the servomotors in accordance with manipulations of the operation units 110 through the operation controllers 340 so that torques are produced onto the rotation axes of the servomotors to assist the operator in his or her operation. Accordingly, the operator can manually operate the operation units 110 by relatively small forces.

As shown in FIG. 17, the first controller 310 is configured to control the robot arm 50 in accordance with manual operations received by the arm operation unit 60. For example, the first controller 310 is configured to control the robot arm 50 in accordance with manual operations received by the joystick 62 of the arm control unit 60. Specifically, the arm controller 320 provides an input signal provided from the joystick 62 to the first controller 310. The first controller 310 generates position commands based on the received input signal and the rotation angles detected by the encoders EN1, and provides the position commands to the servo controllers SC1 via the arm controller 320. The servo controllers SC1 generate current commands based on the position commands provided from the arm controller 320 and the rotation angles detected by the encoders EN1, and provide the current commands to the servomotors SM1. Accordingly, the robot arm 50 is moved in accordance with an operation command provided to the joystick 62.

The first controller 310 controls the robot arm 50 based on an input signal from the linear switch 63 of the arm operation unit 60. Specifically, the arm controller 320 provides an input signal provided from the linear switch 63 to the first controller 310. The first controller 310 generates position commands based on the received input signal and the rotation angles detected by the encoder EN1 or EN3, and provides the position commands to the servo controller SC1 or SC3 via the arm controller 320. The servo controller SC1 or SC3 generate current commands based on the position commands provided from the arm controller 320 and the rotation angles detected by the encoder EN1 or EN3, and provide the current commands to the servomotor SM1 or SM3. Accordingly, the robot arm 50 is moved in accordance with an operation command provided to the linear switch 63.

The medical cart 10 includes the positioner controller 330. The positioner controller 330 is configured to control the positioner 30 and the medical cart 10. The positioner 30 includes a plurality of servomotors SM4, a plurality of encoders EN4 and a plurality of speed reducers corresponding to a plurality of joints 33 of the positioner 30. The medical cart 10 includes the servo controllers SC4 configured to control the servomotors SM4 of the positioner 30. The medical cart 10 includes servomotors SM5 and SM6 configured to drive the front wheels of the medical cart 10, the encoders EN5 and EN6, speed reducers, the servo controllers SC5 and SC6, and brakes BRK.

The operation controllers 340 are provided in a main body of the remote control apparatus 200. The operation controllers 340 are configured to control the operating units 110. The operation controllers 340 are associated with both the left-hand side operation unit 110L and the right-hand side operation unit 110R as shown in FIG. 17. The operation unit 110 includes servomotors SM, encoders EN and speed reducers corresponding to the plurality of joints JT21 to JT27 of the operation unit 110. The servo controllers SC configured to control the servomotors SM of the operation unit 110 is provided in the main body of the remote control apparatus 200 adjacent to the operation controllers 340.

As shown in FIG. 17, the vision unit 300 and the image processing unit 400 are connected to the first controller 310 through LAN. The display 220 is connected to the vision unit 300.

Figure 21:
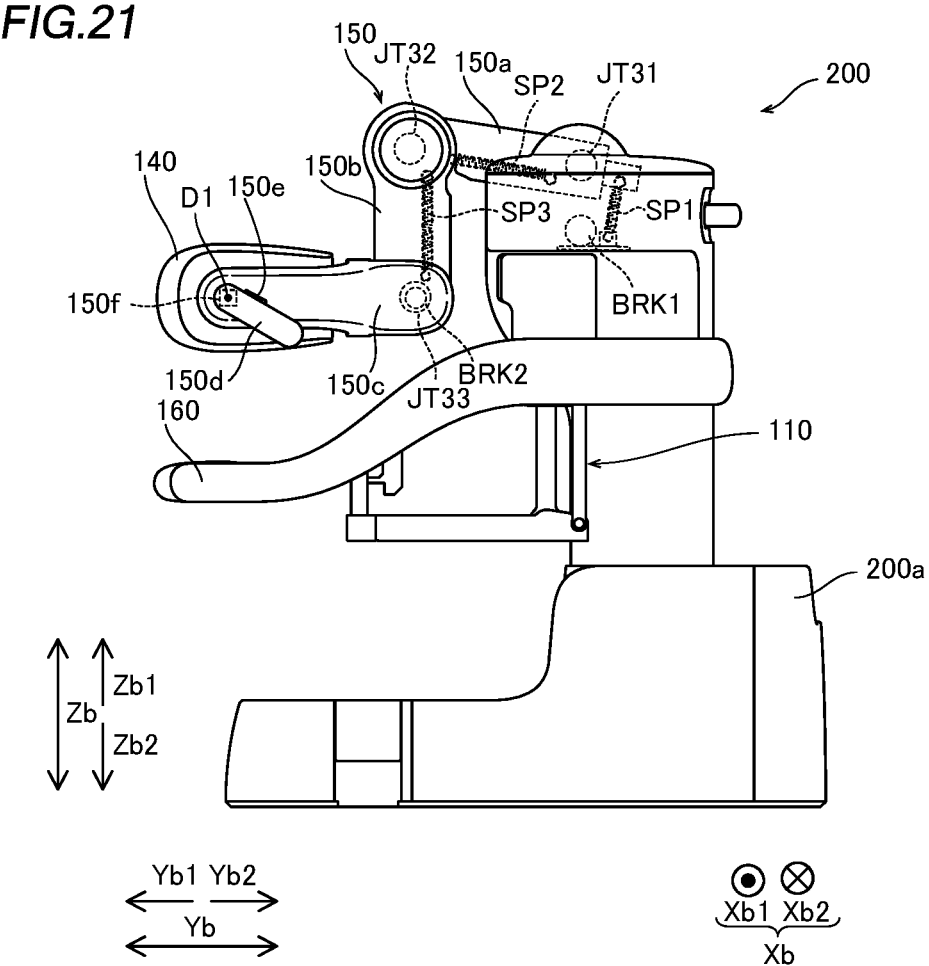
FIG. 21 is a side view of a remote control apparatus according to the one embodiment.
Figure 22:
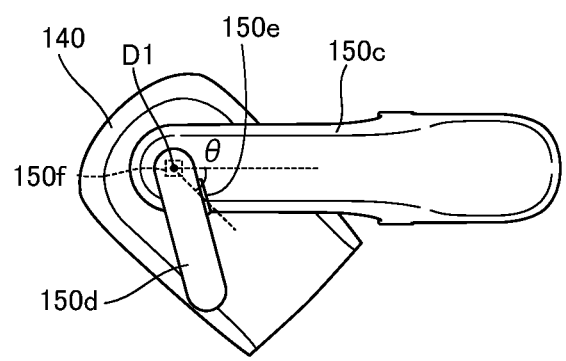
FIG. 22 is a diagram showing a monitor inclined.

In this embodiment, as shown in FIG. 21, the monitor 140 is a scope-type display device configured to display images captured by the endoscope 3. As shown in FIG. 22, the monitor 140 can pivot so as to be inclined with respect to a horizontal plane. Specifically, the monitor 140 can pivot about a D1 axis extending in the Xb direction.

As shown in FIG. 21, the support arm 150 supports the monitor 140, and can adjust a height of the monitor 140 to a height of eyes of the operator such as doctor. The support arm 150 includes a first link part 150a, a second link part 150b, a third link part 150c, and grip parts 150d. One end of the first link part 150a is attached to a main body 200a of the remote control apparatus 200. A Joint JT31 is arranged at the one end of the first link part 150a. Another end of the first link part 150a is coupled to one end of the second link part 150b by a joint JT32. Another end of the second link part 150b is coupled to one end of the third link part 150c by a joint JT33. The monitor 140 is pivotably attached to the third link part 150c. The grip parts 150d are arranged on the third link part 150c. The grip parts 150d are arranged on both Xb1 and Xb2 sides of the third link part 150c.

A spring SP1 is arranged in a base end part of the first link part 150a. The first link part 150a is lifted by the spring SP1. In addition, a spring SP2 is arranged in the first link part 150a. The second link part 150b is lifted by the spring SP2. Also, a spring SP3 is arranged in the second link part 150b. The third link part 150c is lifted by the spring SP3. A brake BRK1 is arranged in a base end side of the first link part 150a. The brake BRK1 is configured to hold the joint JT31 so that the joint JT31 not rotate. A brakes BRK2 is arranged in the joint JT33, which couples the second link part 150b to the third link part 150c. The brake BRK2 is configured to hold the joint JT33 so that the joint JT31 not rotate. The spring SP1, the spring SP2 and the spring SP3 are arranged to be able to support self-weights of the support arm 150 and the monitor 140. The brakes BRK1 and BRK2 are a negative actuated type electromagnetic brake configured to holds the joints JT31 and JT33 even when an external force is applied. One or two of the spring SP1, the spring SP2 and the spring SP3 may be provided. The brake BRK1 or the brake BRK2 may be provided. The brake JT32 may include a brake.

A switch 150e is configured to switch between an enable state in which a posture of the support arm 150 can be changed and a disable state in which the support arm cannot be changed. The switch 150e is arranged on the grip part 150d. When the operator presses the switch 150e, the brake BRK1 and the brake BRK2 are deactivated so that the operator can change the posture of the support arm 150 by grasping and moving the grip parts 150d. The operator can change an inclination angle of the monitor 140 with respect to the horizontal plane by grasping and inclining the grip parts 150d. A brake BRK3 may be provided to disable pivoting of the monitor 140 with respect to the third link part 150c. The brake BRK3 may be configured to be deactivated to enable change of the inclination angle of the monitor 140 with respect to the horizontal plane in addition to change of the posture of the support arm 150 when the operator presses the switch 150e.

The monitor 140 can pivot with respect to the third link part 150c about the D1 axis. The remote control apparatus 200 includes an angle sensor 150f configured to detect an inclination of the monitor 140 with respect to the horizontal plane. The angle sensor 150f is configured to detect a pivoting angle θ of the monitor 140 about the D1 axis extending in the horizontal plane. In this embodiment, a controller (not shown) is configured to control a posture of the support arm 150 so that a posture of the support arm 150 is changed by the joint in accordance with manual operation of the operator while the third link part 150c is held in a horizontal orientation. The angle sensor 150f is configured to detect the pivoting angle θ of the monitor 140 with respect to the third link part 150c whereby detecting an inclination of monitor 140 with respect to the horizontal plane. The angle sensor 150f is an encoder configured to detect the pivoting angle θ of the monitor 140, for example. The angle sensor 150f is an example of an inclination detection sensor.

Figure 23:
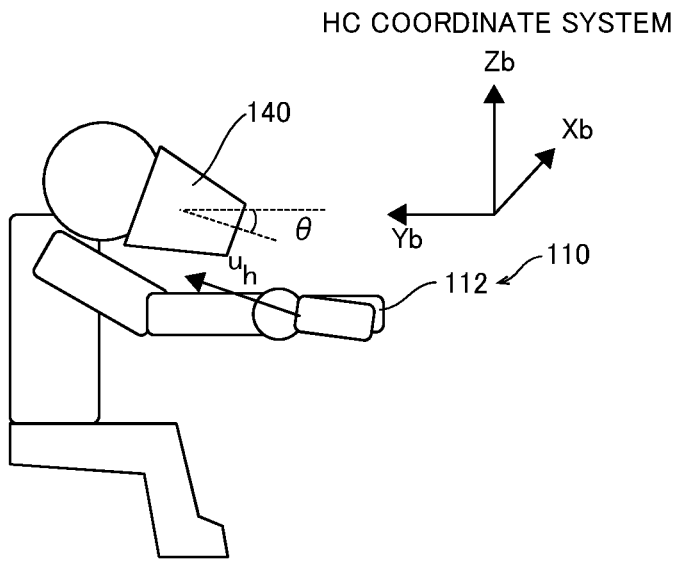
FIG. 23 is a diagram showing an operator and an HC coordinate system.
Figure 24:
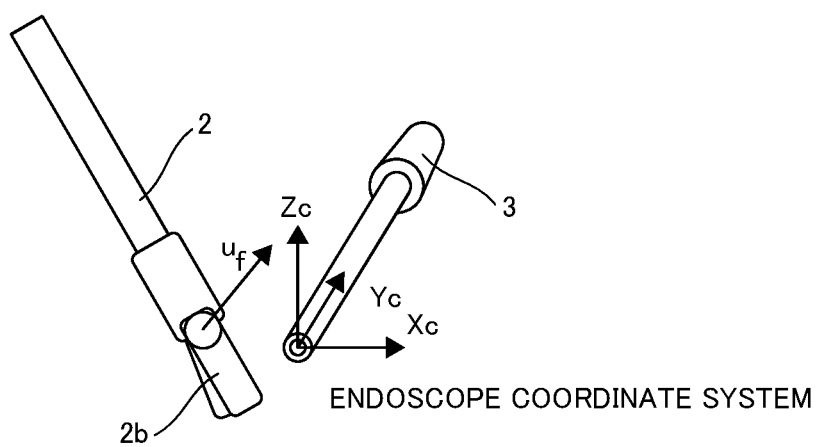
FIG. 24 is a diagram showing a surgical instrument, the endoscope and an endoscope coordinate system.

As shown in FIG. 23, a coordinate system of the operation unit 110 is used to describe a position of the operation unit 110. Hereinafter, the coordinate system of the operation unit 110 is referred to as an HC coordinate system. As shown in FIG. 24, a coordinate system of the endoscope 3 is used to describe a position of the endoscope 3. Hereinafter, the coordinate system of the endoscope 3 is referred to as an endoscope coordinate system. For example, in a case in which the operator moves the operation unit 110 in the Yb direction of the HC coordinate system, the endoscope 3 correspondingly moves in the Yc direction of the endoscope coordinate system in which the surgical instrument 1 extends.

In this case, it has been found that when a line of sight of the operator who watches the monitor 140 changes, this change caused a change of an operation direction of the operation unit 110 manually operated by the operator. For example, in a case in which the monitor 140 is slightly inclined downward, we consider manual operation of an operator who intends to translationally move the surgical instrument 1 in the Yc direction of the endoscope coordinate system. In this case, we found that the operator moves the operation unit 110 not in the Yb direction of the HC coordinate system but in a direction indicated by a vector uh shown that diagonally extends downward and intersects the Yb direction. This means that the surgical instrument 1 translationally moves in a direction different from the direction in which the operator intended to translationally move the surgical instrument. The vector uh in FIG. 23 is a vector representing a translational direction in which the operation unit 110 moves as viewed in the HC coordinate system.

To address this, the first controller 310 is configured to correct translational movement of the surgical instrument 1 based on an inclination detected by the angle sensor 150f. For example, the surgical instrument 1 is the instrument 2. Specifically, the first controller 310 is configured to correct a direction of translational movement of the surgical instrument 1 based on an inclination detected by the angle sensor 150f so as to translationally move the surgical instrument 1 in a direction in which the endoscope 3 extends when receiving an operation that translationally moves the surgical instrument 1. In other words, even in a case in which the translation vector uh of the operation unit 110 diagonally points upward, the first controller 310 is configured to correct a translation vector uf so that the vector uf agrees with the Yc direction of the endoscope coordinate system. The vector uf in FIG. 23 is a translation vector representing a translational direction in which the forceps 3b moves from a viewpoint of a robot reference coordinate system.

In a case in which the monitor 140 is orientated in parallel to the horizontal plane, the first controller 310 is configured to control translational movement of the surgical instrument 1 without correcting a direction of the translational movement of the surgical instrument 1 when receiving an operation that translationally moves the surgical instrument 1 in the frontward/rearward direction from a viewpoint of the operator. In other words, in a case in which the monitor 140 is orientated in parallel to the horizontal plane, the first controller 310 is configured to translationally moves the surgical instrument 1 in the Yc direction of the endoscope coordinate system when receiving an operation that translationally moves the surgical instrument in the Yb direction of the HC coordinate system.

As shown in the following equation 1, the first controller 310 is configured to correct a direction of translational movement of the surgical instrument 1 based on a posture term that represents a posture of the endoscope 3 in the coordinate system of endoscope 3 and a correction term that corrects the posture term based on an inclination detected by the angle sensor 150f when receiving an operation that translationally moves the surgical instrument 1. Specifically, the first controller 310 is configured to correct the translation vector of the surgical instrument 1 by multiplying the translation vector uh of the surgical instrument 1 in the coordinate system of the operation unit 110 by a posture matrix Hcam of the endoscope 3 relating to the coordinate system of endoscope 3 and a posture correction matrix Rx relating to an inclination detected by the angle sensor 150$f$ when receiving an operation that translationally moves the surgical instrument 1 as shown in the following equation.

$$uf = Hcam \cdot R \cdot uh$$

Hcam is a posture matrix in a camera coordinate system from the viewpoint of the robot reference coordinate system. Rx is a posture correction matrix depending on a pivoting angle θ of the monitor 140 about the D1 axis. Rx varies in accordance with the pivoting angle θ. Also, Rx corresponds to an inclination of the monitor 140 with respect to the horizontal plane. That is, the first controller 310 is configured to correct translational movement of the surgical instrument 1 based on the pivoting angle θ about the D1 axis detected by the angle sensor 150$f$.

The first controller 310 is configured to correct translational movement of the surgical instrument 1 based on an inclination detected by the angle sensor 150$f$ in surgical operation in which the remote control apparatus 200 receives manual operation relating to the surgical instrument 1. Specifically, the first controller 310 is configured to correct translational movement of the surgical instrument 1 based on an inclination detected by the angle sensor 150$f$ during execution of a following operation that moves the surgical instrument 1. Also, during the surgical operation, when the operator presses the switch 150$e$ and changes an inclination angle of the monitor 140 with respect to the horizontal plane, Rx in the equation 1 varies in accordance with an inclination angle of the monitor 140 after the inclination angle change. Translational movement of the surgical instrument 1 is then corrected based on Rx after the change, (Movement of Endoscope)

Figure 25:
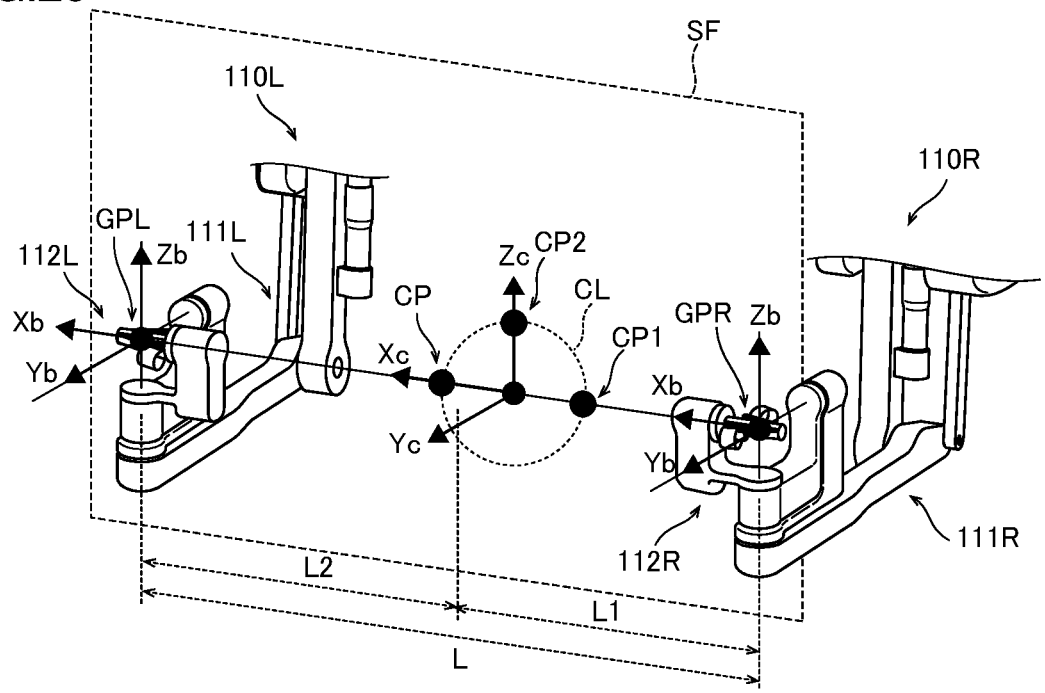
FIG. 25 is a diagram illustrating that an imaginary plane is specified.
Figure 26:
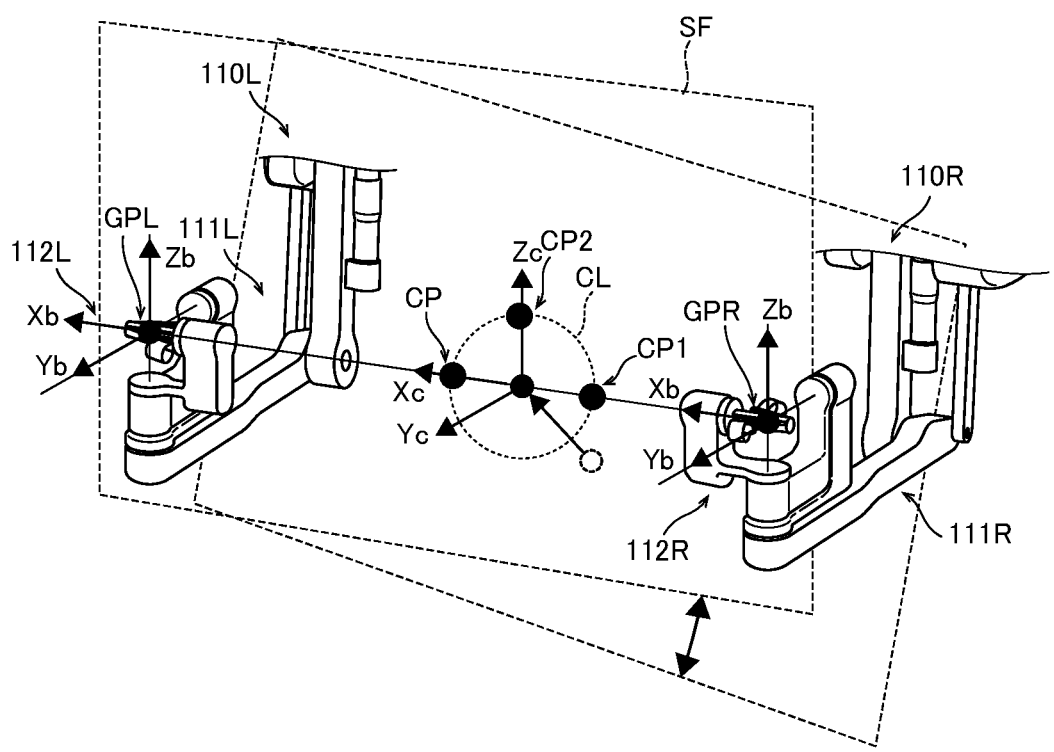
FIG. 26 is a diagram illustrating movement of the endoscope.

Operations that operate the endoscope 3 to move by the operation unit 110R and the operation unit 110L can be accepted during operation on the camera pedal 124 by the operator. Specifically, operations that operate the endoscope 3 to move by the operation unit 110R and the operation unit 110L can be accepted during pressing operation on the camera pedal 124 by an operator's foot. Specifically, as shown in FIG. 25, the first controller 310 is configured to define an imaginary plane SF in a coordinate system of the operation unit 110. The imaginary plane SF is defined as follows. A midpoint of a line segment that connects a gimbal point GPR of the operation unit 110R to a gimbal point GPL of the operation unit 110L is specified as CP. A point that has a Yb coordinate equal to a Yb coordinate of the midpoint CP, Xb and Zb coordinates equal to Xb and Zb coordinates of a midpoint between the midpoint CP and the gimbal point GPR is defined as CP1. An intersection point of a circle CL that has a diameter defined a line segment connecting the midpoint CP to the point CP1 and the same Yb coordinate as the midpoint CP and the point CP1, and a line orthogonal to the line segment, which connects the midpoint CP to the point CP1, is defined as CP2. A plane including CP, CP1 and CP2 is defined as the imaginary plane SF. As shown in FIG. 26, the first controller 310 is configured to calculate an amount of movement of the imaginary plane SF from a previous control cycle to the current control cycle as an amount of movement of an end of the endoscope 3. Specifically, target values of a position of the endoscope 3 at the current control cycle is calculated based on a value of obtained by multiplying a target-value homogeneous transformation matrix relating to a position of endoscope 3 at the previous control cycle by the amount of movement of the imaginary plane SF. In the definition of the imaginary plane SF, a plane that is inclined from the plane including the midpoint CP, the point CP1 and the point CP2 by an angle corresponding to an inclination of the monitor 140 with respect to the horizontal plane detected by angle sensor 150$f$ in a direction in which the monitor 140 is inclined about the Xb axis may be defined as the imaginary plane SF. Alternatively, a plane that is inclined from the plane including the midpoint CP, the point CP1 and the point CP2 by a predetermined fixed angle corresponding to an inclination of the monitor 140 with respect to the horizontal plane about the Xb axis may be defined as the imaginary plane SF. For example, the predetermined fixed angle is −15 degrees.

In this embodiment, the first controller 310 is configured to control at least one of a set of the servomotors SM7$a$, SM7$b$ and SM7$c$ of the operation unit 110R, and a set of the servomotors SM7$a$ SM7$b$ and SM7$c$ of the operation unit 110L to maintain a distance L between the operation unit 110R and the operation unit 110L when a operation to move the endoscope 3 by the operation unit 110R and the operation unit 110L. Specifically, the first controller 310 is configured to control a function of moving both sets of the servomotors SM7$a$, SM7$b$ and SM7$c$ of the operation unit 110R, and the servomotor SM7$a$ SM7$b$ and SM7$c$ of the operation unit 110L to maintain a distance L between the operation unit 110R and the operation unit 110L when the operation to move the endoscope 3 by the operation unit 110R and the operation unit 110L.

Also, in this embodiment, the first controller 310 is configured to specify a midpoint CP of a line segment that connects the operation unit 110L to the operation unit 110R. Specifically, the first controller 310 is configured to specify a midpoint CP of a line segment that connects the gimbal point GPR of the operation unit 110R to the gimbal point GPL of the operation unit 110L. The first controller 310 is configured to control a function of moving at least one of a set of the servomotors SM7$a$, SM7$b$ and SM7$c$ of the operation unit 110R, and a set of the servomotors SM7$a$ SM7$b$ and SM7$c$ of the operation unit 110L to maintain a distance L1 between the midpoint CP and the gimbal point GPR, and a distance L2 between the midpoint CP and the gimbal point GPL when the operation to move the endoscope 3 by the operation unit 110R and the operation unit 110L. The following description describes a method of generating instruction values to be provided to the operation units 110 to maintain the distance L by the first controller 310.

(Instruction-Value Generation Method)

Figure 27:
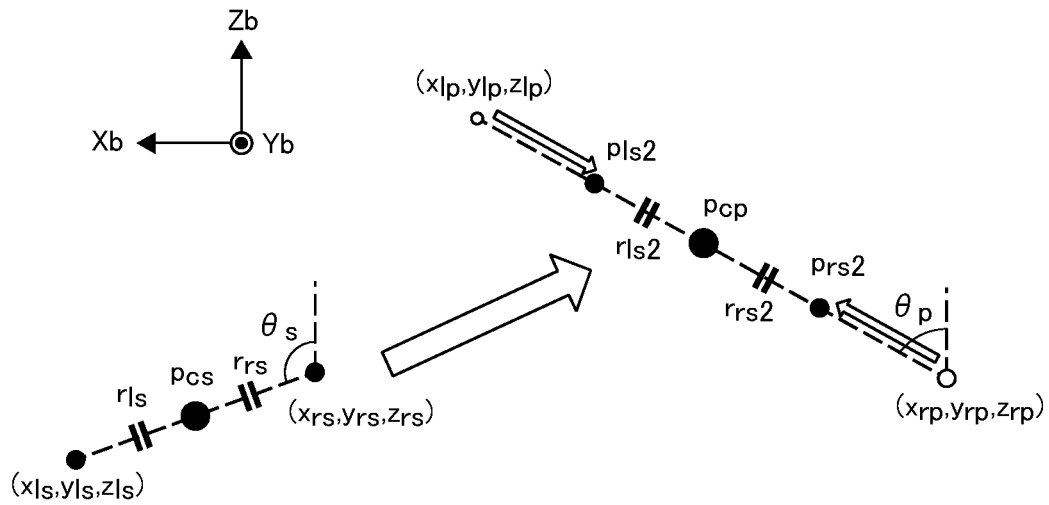
FIG. 27 is a diagram illustrating generating of instruction values to be provided to the operation unit.

In this embodiment, as shown in FIG. 27, the first controller 310 is configured to control a function of moving at least one of a set of the servomotors SM7$a$, SM7$b$ and SM7$c$ of the operation unit 110R, and a set of the servomotors SM7$a$ SM7$b$ and SM7$c$ of the operation unit 110L to maintain a distance L1 between the midpoint CP and the gimbal point GPR, and a distance L2 between the midpoint CP and the gimbal point GPL when the operation to move the endoscope 3 by the operation unit 110R and the operation unit 110L. In other words, the first controller 310 is configured to project a coordinate of the gimbal point GPR of the operation unit 110R and a coordinate of the gimbal point GPL of the operation unit 110L positioned in the imaginary plane SF onto the Xb-Zb plane. The first controller 310 can then control a function of moving at least one of a set of the servomotors SM7$a$, SM7$b$ and SM7$c$ of the operation unit 110R, and a set of the servomotors SM7$a$ SM7b and SM7c of the operation unit 110L to maintain the distances L1 and L2 projected onto the Xb-Zb plane. The following description describes a method of generating instruction values in detail.

Coordinates of the gimbal point GPR of the operation unit 110R that are projected onto the Xb-Zb plane are specified as $(x_{rs}, y_{rs}, z_{rs})$ at the moment of pressing the camera pedal 124 by an operator's foot. Coordinates of the gimbal point GPL of the operation unit 110L that are projected onto the Xb-Zb plane are specified as $(x_{ls}, y_{ls}, z_{ls})$ at the moment of pressing the camera pedal 124 by the operator's foot. The coordinates $(x_{cs}, y_{cs}, z_{cs})$ of the midpoint $P_{cs}$ in the Xb-Zb plane can be calculated by the following equation. Note that coordinates shown below represent coordinates in the Xb-Zb plane.

$$(x_{cs}, y_{cs}, z_{cs}) = (x_{ls} + x_{rs}/2, y_{ls} + y_{rs}/2 z_{ls} + z_{rs}/2)$$

A distance L1 and a distance L2 that are projected onto the Xb-Zb plane are specified as $r_{rs}$ and $r_{ls}$ at the moment of pressing the camera pedal 124 by the operator's foot. An angle that is formed by a line segment obtained by projecting a line segment that connects the gimbal point GPR to the gimbal point GPL onto the Xb-Zb plane, and the Zb axis is specified as $\theta_s$ at the moment of pressing the camera pedal 124 by the operator's foot. $\theta_s$ can be calculated by the following equation.

$$\theta_s = \arctan\{(x_{ls} - x_{rs}), (z_{ls} - z_{rs})\}$$

Subsequently, coordinates of the gimbal point GPR of the operation unit 110R are specified as $(x_{rp}, y_{rp}, z_{rp})$ and coordinates of the gimbal point GPL of the operation unit 110L are specified as $(x_{lp}, y_{lp}, z_{lp})$ at a moment in travel of the endoscope 3. The coordinates $(x_{cp}, y_{cp}, z_{cp})$ of the midpoint $P_{cp}$ in the Xb-Zb plane can be calculated by the following equation.

$$(x_{cp}, y_{cp}, z_{cp}) = \left(\frac{x_{lp} + x_{rp}}{2}, \frac{y_{lp} + y_{rp}}{2}, \frac{z_{lp} + z_{rp}}{2}\right)$$

An angle that is formed by a line segment obtained by projecting a line segment that connects the gimbal point GPR to the gimbal point GPL onto the Xb-Zb plane, and the Zb axis is specified as $\theta_p$ at a moment in travel of the endoscope 3. $\theta_p$ can be calculated by the following equation.

$$\theta_p = \arctan\{(x_{lp} - x_{rp}), (z_{lp} - z_{rp})\}$$

A distance L1 and a distance L2 that are projected onto the Xb-Zb plane are specified as $r_{rs2}$ and $r_{ls2}$ at a moment in travel of the endoscope 3. $r_{rs2}$ and $r_{ls2}$ can be calculated by the following equations.

$$r_{rs2} R_y(\theta_p - \theta_s) r_{rs}$$

$$r_{lc2} R_y(\theta_p - \theta_s) r_{ls}$$

$R_y$ in the above equations is a rotation matrix representing rotation about the Yb axis.

Coordinates that make $r_{rs2}$ equal to $r_{rs}$ at a moment in travel of the endoscope 3 are specified as $p_{rp2}$ ($x_{rp2}, y_{rp2}, z_{rp2}$). Also, coordinates that make $r_{ls2}$ equal to $r_{ls}$ are specified as $p_{lp2}$ ($x_{lp2}, y_{lp2}, z_{lp2}$). $p_{rp2}$ and $p_{lp2}$ can be calculated by the following equations.

$$p_{rp2} = p_{cp} + r_{rs2}$$

$$p_{lp2} = p_{cp} + r_{ls2}$$

The first controller 310 is configured to calculate $p_{rp2}$ and $p_{lp2}$ at every sampling cycle and to calculate axis values of the joint JT21, the joint JT22 and the joint JT23 by applying the calculated values to an inverse kinematics calculation. The axis values are transmitted to the servo controllers SC7a, SC7b and SC7c as instruction values.

(Exemplary Calculation of Instruction Values)

The following description describes exemplary calculation of instruction values to be provided to the operation units 110 to maintain a distance L.

Coordinates of the gimbal point GPR of the operation unit 110R are specified as (−10, 10, 0) at the moment of pressing the camera pedal 124 by an operator's foot. Coordinates of the gimbal point GPL of the operation unit 110L are specified as (10, 0, 0) at the moment of pressing the camera pedal 124 by the operator's foot. Coordinates of the gimbal point GPR of the operation unit 110R are specified as (20, 20, −5) at a moment in travel of the endoscope 3. Coordinates of the gimbal point GPL of the operation unit 110L are specified as (10, 0, 5) at a moment in travel of the endoscope 3.

Coordinates of the midpoint CP are specified as (0, 5, 0) at the moment of pressing the camera pedal 124 by the operator's foot. Coordinate of $r_{rs}$ are specified as (−10, 5, 0) at the moment of pressing the camera pedal 124. Coordinates of $r_{ls}$ are specified as (10, −5, 0) at the moment of pressing the camera pedal 124. $\theta_s$ is specified as 90 degrees at the moment of pressing the camera pedal 124.

Coordinates of the midpoint CP are specified as (−5, 10, 0) at a moment in travel of the endoscope 3. $\theta_p$ is specified as 71.56 degrees at a moment in travel of the endoscope 3. A differential value between $\theta_s$ and $\theta_p$ is 18.44 degrees. Accordingly, $r_{rs2}$ is calculated as (−9.49, 5, −3.16). Also, $r_{ls2}$ is calculated as (9.49, −5, 3.16). As a result, $p_{rp2}$ is calculated as (−14.49, 15, −3.16). Also, $p_{lp2}$ is calculated as (4.49, 5, 3.16).

Figure 28:
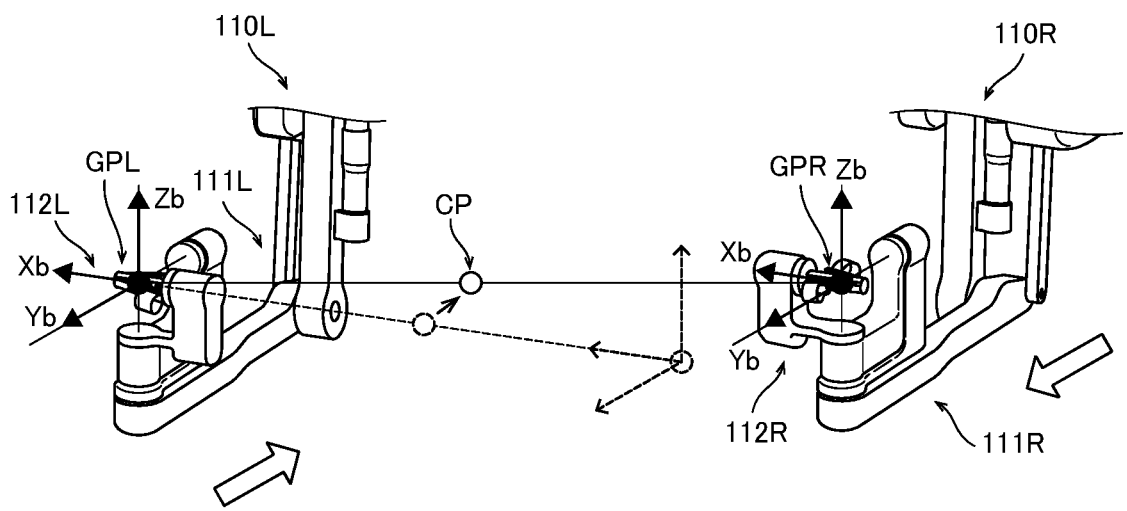
FIG. 28 is a diagram showing the pair of operation units deviated from each other in a Yb direction.

In this embodiment, as discussed above, the first controller 310 is configured to control a function of moving at least one of a set of the servomotors SM7a, SM7b and SM7c of the operation unit 110R, and a set of the servomotors SM7a SM7b and SM7c of the operation unit 110L to maintain a distance between the operation unit 110R and the midpoint CP and a distance between the operation unit 110L and the midpoint CP in the Xb-Zb plane including the Zb axis and the Xb axis that is moved in the Yb axis direction in the reference coordinate system when the operation to move the endoscope 3 in a direction including a directional component of the Yb axis direction by the operation unit 110R and the operation unit 110L. That is, because $R_y$ in the above equations 6 and 7 is a rotation matrix representing rotation about the Yb axis, a value 5 of the Yb axis in (−10, 5, 0) of $r_{rs}$ is equal to a value 5 of the Yb axis in (−9.49, 5, −3.16) of $r_{rs2}$. Similarly, a value −5 of the Yb axis in (10, −5, 0) of $r_{ls}$ is equal to a value −5 of the Yb axis in (−9.49, −5, 3.16) of $r_{ls2}$. Accordingly, when an operation to move the endoscope 3 by the operation unit 110R and the operation unit 110L is received, distances in the Yb direction from the midpoint CP at the moment of pressing the camera pedal 124 by the operator's foot are kept 5 and −5. Consequently, as shown in FIG. 28, when an operation to move the endoscope 3 to move is received, if the operation unit 110L and the operation unit 110R are deviated from each other in the Yb direction, forces are applied to the operation unit 110R and the operation unit 110R to reduce the deviation.

On the other hand, a value −10 of the Xb axis in (−10, 5, 0) of $r_{rs}$ and a value −9.49 of the Xb axis in (−9.49, 5, −3.16) of $r_{rs}2$ are different from each other. Also, a value 0 of the Zb axis in (−10, 5, 0) of r rs and a value −3.16 of the Zb axis in (−9.49, 5, −3.16) of $r_{rs2}$ are different from each other.

Figure 29:
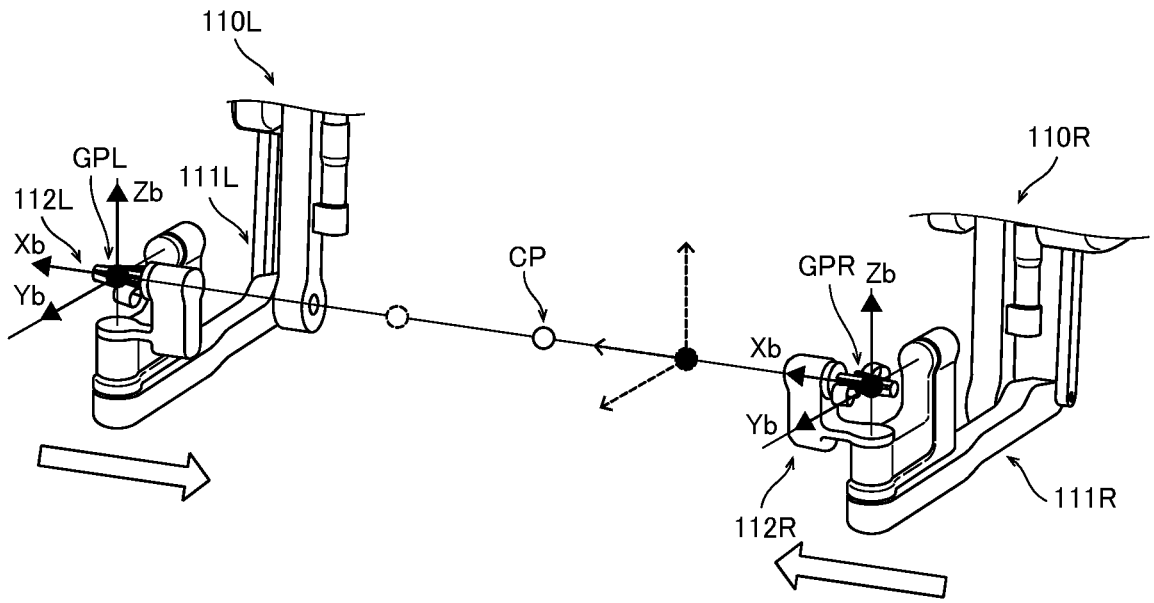
FIG. 29 is a diagram showing the pair of operation units moved in an Xb direction.
Figure 30:
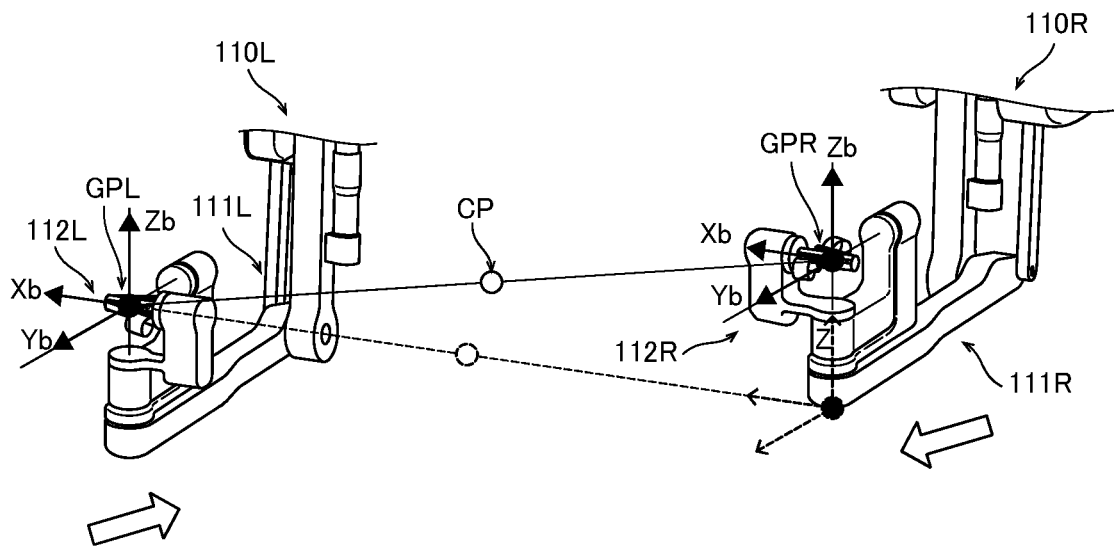
FIG. 30 is a diagram showing the pair of operation units deviated from each other in a Zb direction.

For example, as shown in FIG. 29, if the operation unit 110R and the operation unit 110L are moved away from each other in the Xb direction, forces are applied to the operation unit 110R and the operation unit 110R to move them closer. Also, as shown in FIG. 30, if the operation unit 110R and the operation unit 110L are deviated from each other in the Zb direction, forces are applied to the operation unit 110R and the operation unit 110R to rotate a line segment that connects the gimbal point GPR of the operation unit 110R to the gimbal point GPL of the operation unit 110R In the Xb-Zb plane.

(Robotic-Surgical-System Control Method)

Figure 31:
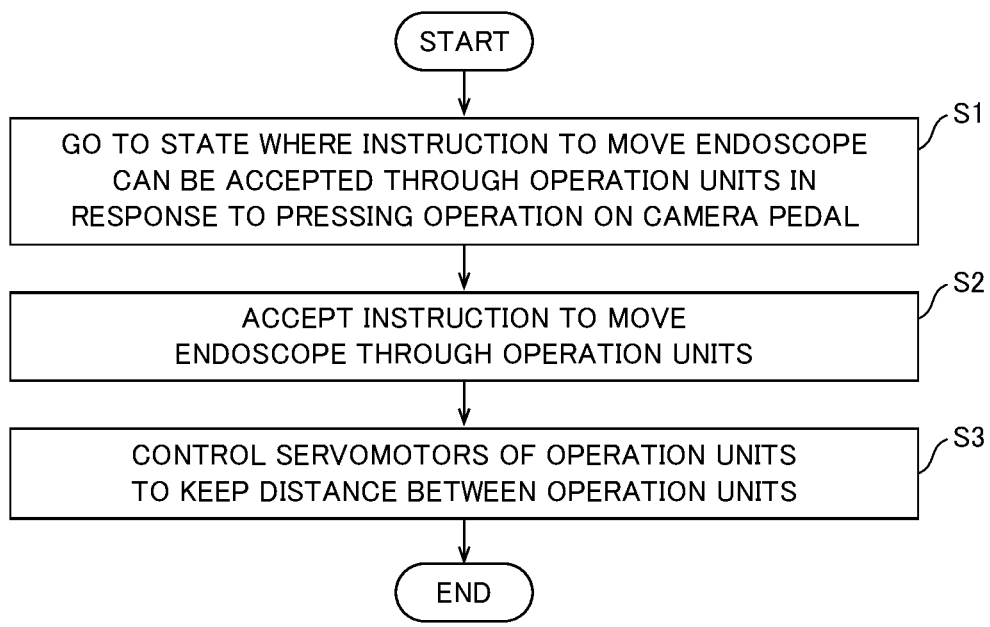
FIG. 31 is a diagram showing a control-flow of the robotic surgical system according to the one embodiment.

The following description describes a method of FIG. 31, in step S1, in response to pressing operation on the camera pedal 124 by an operator's foot, the first controller 310 goes into a state in which operations to move the endoscope 3 can be accepted by the operation unit 110R and the operation unit 110L.

In step S2, the first controller 310 accepts an operation to move the endoscope 3 to move by the operation unit 110R and the operation unit 110L.

In step S3, when the operation to move the endoscope 3 by the operation unit 110R and the operation unit 110L, the first controller 310 controls a function of moving at least one of a set of the servomotors SM7a, SM7b and SM7c of the operation unit 110R, and a set of the servomotors SM7a SM7b and SM7c of the operation unit 110L to maintain a distance L between the operation unit 110R and the operation unit 110L. In this embodiment, the first controller 310 controls a function of moving both sets of the servomotors SM7a, SM7b and SM7c of the operation unit 110R, and of the servomotor SM7a SM7b and SM7c of the operation unit 110L to maintain a distance L by using the above equations 2 to 9.

Advantages of the Embodiment

The first controller 310 is configured to control a function of moving at least one of a set of the servomotors SM7a, SM7b and SM7c of the operation unit 110R, and a set of the servomotors SM7a SM7b and SM7c of the operation unit 110L to maintain a distance L between the operation unit 110R and the operation unit 110L when the operation to move the endoscope 3 by the operation unit 110R and the operation unit 110L is received. Accordingly, a distance between the operation unit 110R and the operation unit 110L after movement of the endoscope 3 can be the same as before the movement of the endoscope 3. Consequently, operators unnecessarily move the operation unit 110R and the operation unit 110L to their original relative position. Therefore, it is possible to reduce a wasted motion of operators after movement of the endoscope 3.

The first controller 310 is configured to control at least one of a set of the servomotors SM7a, SM7b and SM7c of the operation unit 110R, and a set of the servomotors SM7a SM7b and SM7c of the operation unit 110L so that the distance L between the operation unit 110R and the operation unit 110L at the time of pressing the camera pedal 124 is maintained. Accordingly, the distance L between the operation unit 110R and the operation unit 110L at the point of pressing the camera pedal 124 can be kept until pressing operation of the camera pedal 124 is released. As a result, a distance L between the operation unit 110R and the operation unit 110L at restart of manual operation that instructs the instrument 2 to move can be equal to the point of stopping the manual operation, which instructs the instrument 2 to move. Consequently, operators unnecessarily move a pair of the operation unit 110R and the operation unit 110L to their original relative position.

The first controller 310 is configured to specify a midpoint CP of a line segment that connects the gimbal point GPR of the operation unit 110R to the gimbal point GPL of the operation unit 110L, and to control a function of moving at least one of a set of the servomotors SM7a, SM7b and SM7c of the operation unit 110R, and a set of the servomotors SM7a SM7b and SM7c of the operation unit 110L to maintain a distance L1 between the midpoint CP and the gimbal point GPR, and a distance L2 between the midpoint CP and the gimbal point GPL when to move the endoscope 3 by the operation unit 110R and the operation unit 110L. Accordingly, the distance L between the operation unit 110R and the operation unit 110L can be easily kept by using the midpoint CP as a reference point.

The first controller 310 is configured to control a function of moving at least one of a set of the servomotors SM7a, SM7b and SM7c of the operation unit 110R, and a set of the servomotors SM7a SM7b and SM7c of the operation unit 110L to maintain a distance $r_{rs}$ between the midpoint CP and the gimbal point GPR, and a distance $r_{ls}$ between the midpoint CP and the gimbal point GPL in the Xb-Zb plane including the Xb axis and the Zb axis when to move the endoscope 3 by the operation unit 110R and the operation unit 110L. Accordingly, it is easily possible to maintain the distance between the operation unit 110R and the operation unit 110L in the Xb-Zb plane including the Xb axis and the Zb axis.

The first controller 310 is configured to control a function of moving at least one of a set of the servomotors SM7a, SM7b and SM7c of the operation unit 110R, and a set of the servomotors SM7a SM7b and SM7c of the operation unit 110L to maintain a distance between the operation unit 110R and the midpoint CP and a distance between the operation unit 110L and the midpoint CP in the Xb-Zb plane that is moved in the Yb axis direction when to move the endoscope 3 by the operation unit 110R and the operation unit 110L. Accordingly, it is easily possible to maintain the distance between the operation unit 110R and the operation unit 110L on the Yb axis direction.

The first controller 310 is configured to control a function of moving both sets of the servomotors SM7a, SM7b and SM7c of the operation unit 110R, and the servomotor SM7a SM7b and SM7c of the operation unit 110L to maintain a distance L between the operation unit 110R and the operation unit 110L when to move the endoscope 3 by the operation unit 110R and the operation unit 110L. Accordingly, as compared with a case in which only one of sets of the servomotors SM7a, SM7b and SM7c of the operation unit 110R, and the servomotor SM7a SM7b and SM7c of the operation unit 110L is driven, a function of maintaining the distance L between the operation unit 110R and the operation unit 110L can be rapidly controlled.

The operation unit 110R further includes an arm 111R and a wrist part 112R; the operation unit 110L further includes an arm 111L and a wrist part 112L; servomotors SM7a, SM7b and SM7c of the operation unit 110R are arranged in the arm 111R; and servomotors SM7a, SM7b and SM7c of the operation unit 110L are arranged in the arm 111L. Here, the arm 111R and the arm 111L are manually operated to change a position of the endoscope 3. Accordingly, the first controller 310 can effectively maintain the distance L between the operation unit 110R and the operation unit 110L by controlling the servomotor SM7a, SM7b and SM7c arranged in the arm 111R, and the servomotor SM7a, SM7b and SM7c arranged in the arm 111L.

The first controller 310 is configured to incline the imaginary plane SF in accordance with an inclination detected by the angle sensor 150f. Accordingly, the imaginary plane SF can be suitably specified in accordance with an inclination of the monitor 140.

Modified Embodiment

Note that the embodiment disclosed this time must be considered as illustrative in all points and not restrictive. The scope of the present invention is not shown by the above description of the embodiments but by the scope of claims for patent, and all modifications or modified examples within the meaning and scope equivalent to the scope of claims for patent are further included.

While the example in which the first controller 310 is configured to control a function of moving both sets of the servomotors SM7a, SM7b and SM7c of the operation unit 110R, and the servomotor SM7a SM7b and SM7c of the operation unit 110L to maintain a distance L between the operation unit 110R and the operation unit 110L when to move the endoscope 3 by the operation unit 110R and the operation unit 110L has been shown in the aforementioned embodiment, the present disclosure is not limited to this. For example, the first controller 310 may be configured to control a function of moving at least one of a set of the servomotors SM7a, SM7b and SM7c of the operation unit 110R, and a set of the servomotors SM7a SM7b and SM7c of the operation unit 110L to maintain a distance L between the operation unit 110R and the operation unit 110L.

While the example in which the first controller 310 controls a function of moving a set of the servomotors SM7a, SM7b and SM7c of the operation unit 110R, and a set of the servomotors SM7a SM7b and SM7c of the operation unit 110L to maintain a distance L by using the above equations 2 to 9 has been shown in the aforementioned embodiment, the present disclosure is not limited to this. The above equations 2 to 9 are merely illustrative, and the first controller 310 may be configured to control a function of moving a set of the servomotors SM7a, SM7b and SM7c of the operation unit 110R, and a set of the servomotors SM7a SM7b and SM7c of the operation unit 110L to maintain a distance L by using other equations.

While the example in which four robot arms 50 are provided has been shown in the aforementioned embodiment, the present disclosure is not limited to this. In the present disclosure, any number of robot arms 50 may be provided as long as at least one robot arms are provided.

While the example in which the arms 51 and the positioner 30 are constructed of a 7-axis multi-joint robot has been shown in the aforementioned embodiment, the present disclosure is not limited to this. For example, the arms 51 and the positioner 30 are constructed of a multi-joint robot having an axis configuration other than the 7-axis multi-joint robot. The multi-joint robot having an axis configuration other than the 7-axis multi-joint robot can be a 6-axis or 8-axis multi-joint robot, for example.

While the example in which the surgical robot 100 includes the medical cart 10, the positioner 30 and the arm base 40 has been shown in the aforementioned embodiment, the present disclosure is not limited to this. The medical cart 10, the positioner 30 and the arm base 40 are not necessarily provides, and the surgical robot 100 may include only the robot arms 50, for example.

While the example in which a midpoint of a line segment that connects a gimbal point GPR of the operation unit 110R to a gimbal point GPL of the operation unit 110L is specified as a midpoint CP has been shown in the aforementioned embodiment, the present disclosure is not limited to this. In the present disclosure, a midpoint of a line segment that connects a point other than the gimbal point GPR of the operation unit 110R to a point other than the gimbal point GPL of the operation unit 110L may be specified as the midpoint CP Functions of elements disclosed in this specification can be realized by a circuit or processing circuit including a general purpose processor, a dedicated processor, an Integrated circuit, ASIC (Application Specific Integrated Circuits), a conventional circuit and/or combination of them configured or programmed to realize the functions disclosed. Because processors include transistors and other circuits, they are considered as a processing circuits or a circuit. In the present disclosure, circuits, units or means are hardware for realizing the functions stated above, or hardware programmed to realize the functions stated above. The hardware can be hardware disclosed in this specification, or may be other known hardware programed or configured to realize the functions stated above. In the case in which the hardware is a processor that can be considered as one type of circuits, the circuit, means or unit is a combination of hardware and software, and the software is used for configuration of the hardware and/or the processor.

What is claimed is:

1. A robotic surgical system comprising:
    a surgical apparatus including a plurality of robot arms configured to support an endoscope, a first surgical instrument and a second surgical instrument;
    an operation apparatus including a first operation unit that is configured to be operated by a right hand of an operator to receive a first operation for the first surgical instrument and includes a first driver, and a second operation unit that is configured to be operated by a left hand of the operator to receive a second operation for the second surgical instrument and includes a second driver; and
    a controller, wherein
    the controller is configured to perform operations comprising operations to
        control at least one of the first driver and the second driver to maintain a distance between the first operation unit and the second operation unit when a third operation to move the endoscope by the first operation unit and the second operation unit is received,
        specify a midpoint of a line segment that connects the first operation unit to the second operation unit, and
        control at least one of the first driver and the second driver to maintain a first distance between the midpoint and the first operation unit, and a second distance between the midpoint and the second operation unit when the third operation to move the endoscope by the first operation unit and the second operation unit is received, and
    the midpoint is a midpoint of a line segment that connects a first gimbal point of the first operation unit to a second gimbal point of the second operation unit.

2. The robotic surgical system according to claim 1, wherein
    the operation apparatus further includes an input configured to allow accepting the third operation to move the endoscope by the first operation unit and the second operation unit during operation; and
    the controller is configured to control at least one of the first driver and the second driver so that the distance between the first operation unit and the second operation unit at the time of a fourth operation of the input device is maintained during a period receiving the third operation and the fourth operation.

3. A robotic surgical system comprising:
a surgical apparatus including a plurality of robot arms configured to support an endoscope, a first surgical instrument and a second surgical instrument;
an operation apparatus including a first operation unit that is configured to be operated by a right hand of an operator to receive a first operation for the first surgical instrument and includes a first driver, and a second operation unit that is configured to be operated by a left hand of the operator to receive a second operation for the second surgical instrument and includes a second driver; and
a controller, wherein
a reference coordinate system of the first operation unit and the second operation unit comprises
a first axis being orthogonal to a floor on which the operation apparatus is placed,
a second axis being orthogonal to the first axis and extending in a frontward and rearward direction of the operator, and
a third axis being orthogonal to the first axis and the second axis, and
the controller is configured to perform operations comprising operations to
specify a midpoint of a line segment that connects the first operation unit to the second operation unit,
control at least one of the first driver and the second driver to maintain a first distance between the midpoint and the first operation unit, and a second distance between the midpoint and the second operation unit when the third operation to move the endoscope by the first operation unit and the second operation unit is received, and
control at least one of the first driver and the second driver to maintain the first distance between the midpoint and the first operation unit, and the second distance between the midpoint and the second operation unit on a plane including the first axis and the third axis when the third operation to move the endoscope by the first operation unit and the second operation unit is received.

4. A robotic surgical system comprising:
a surgical apparatus including a plurality of robot arms configured to support an endoscope, a first surgical instrument and a second surgical instrument;
an operation apparatus including a first operation unit that is configured to be operated by a right hand of an operator to receive a first operation for the first surgical instrument and includes a first driver, and a second operation unit that is configured to be operated by a left hand of the operator to receive a second operation for the second surgical instrument and includes a second driver; and
a controller, wherein
a reference coordinate system of the first operation unit and the second operation unit comprises
a first axis orthogonal to a floor on which the operation apparatus is placed,
a second axis being orthogonal to the first axis and extending in a frontward and rearward direction of the operator, and
a third axis being orthogonal to the first axis and the second axis, and the controller is configured to perform operations comprising operations to
specify a midpoint of a line segment that connects the first operation unit to the second operation unit,
control at least one of the first driver and the second driver to maintain a first distance between the midpoint and the first operation unit, and a second distance between the midpoint and the second operation unit when the third operation to move the endoscope by the first operation unit and the second operation unit is received, and
when the third operation to move the endoscope in a direction including a directional component of the second axis by the first operation unit and the second operation unit is received, the controller is configured to control at least one of the first driver and the second driver to maintain the first distance between the midpoint and the first operation unit, and the second distance between the midpoint and the second operation unit on a plane including the first axis and the third axis that move by the directional component of the second axis in a direction of the second axis.

5. The robotic surgical system according to claim 4, wherein
the operation apparatus includes
a display configured to display an image captured by the endoscope and to pivot so as to be inclined with respect to a horizontal plane, and
an inclination detection sensor configured to detect an inclination of the display with respect to the horizontal plane; and
the controller is configured to incline the plane including the first axis and the third axis in accordance with the inclination detected by the inclination detection sensor.

6. The robotic surgical system according to claim 1, wherein the controller is configured to control both the first driver and the second driver to maintain the distance between the first operation unit and the second operation unit when the third operation to move the endoscope by the first operation unit and the second operation unit is received.

7. The robotic surgical system according to claim 1, wherein
the first operation unit further includes a first arm and a first wrist part,
the second operation unit further includes a second arm and a second wrist part,
the first driver is arranged in the first arm, and
the second driver is arranged in the second arm.

8. An operation apparatus configured to control a first surgical instrument held by a first robot arm, a second surgical instrument held by a second robot arm, and an endoscope held by a third robot arm, the operation apparatus comprising:
a first operation unit that is configured to be operated by a right hand of an operator to receive a first operation for the first surgical instrument and includes a first driver;
a second operation unit that is configured to be operated by a left hand of the operator to receive a second operation for the second surgical instrument and includes a second driver; and
an input configured to allow accepting a third operation to move the endoscope by the first operation unit and the second operation unit during operated by the operator, wherein the first driver and the second driver are driven to maintain a distance between the first operation unit and the second operation unit during a fourth operation of the input is received, the first driver and the second driver are driven to maintain a first distance between a midpoint of a line segment that connects the first operation unit to the second operation unit and the first operation unit, and a second distance between the midpoint and the second operation unit during the fourth operation of the input is received, a reference coordinate system of the first operation unit and the second operation unit comprises
  a first axis orthogonal to a floor on which the operation apparatus is placed,
  a second axis being orthogonal to the first axis and extending in a frontward/rearward direction of the operator, and
  a third axis being orthogonal to the first axis and the second axis; and the first driver and the second driver are driven to maintain the first distance between the midpoint and the first operation unit, and the second distance between the midpoint and the second operation unit on a plane including the first axis and the third axis during the fourth operation of the input is received.

9. The operation apparatus according to claim 8, wherein the midpoint is a midpoint of a line segment that connects a first gimbal point of the first operation unit to a second gimbal point of the second operation unit.

10. An operation apparatus configured to control a first surgical instrument held by a first robot arm, a second surgical instrument held by a second robot arm, and an endoscope held by a third robot arm, the operation apparatus comprising:
  a first operation unit that is configured to be operated by a right hand of an operator to receive a first operation for the first surgical instrument and includes a first driver;
  a second operation unit that is configured to be operated by a left hand of the operator to receive a second operation for the second surgical instrument and includes a second driver; and
  an input configured to allow accepting a third operation to move the endoscope by the first operation unit and the second operation unit during operated by the operator, wherein
  the first driver and the second driver are driven to maintain a distance between the first operation unit and the second operation unit during a fourth operation of the input is received,
  the first driver and the second driver are driven to maintain a first distance between a midpoint of a line segment that connects the first operation unit to the second operation unit and the first operation unit, and a second distance between the midpoint and the second operation unit during the fourth operation of the input is received,
  a reference coordinate system of the first operation unit and the second operation unit comprises
  a first axis orthogonal to a floor on which the operation apparatus is placed,
  a second axis being orthogonal to the first axis and extending in a frontward/rearward direction of the operator, and
  a third axis being orthogonal to the first axis and the second axis, and when the third operation to move the endoscope in a direction including a directional component of the second axis by the first operation unit and the second operation unit is received during the fourth operation of the input is received, the first driver and the second driver are driven to maintain the first distance between the midpoint and the first operation unit, and the second distance between the midpoint and the second operation unit on a plane including the first axis and the third axis that move by the directional component of the second axis in a direction of the second axis.

11. The operation apparatus according to claim 8 further comprising
  a display configured to display an image captured by the endoscope and to pivot so as to be inclined with respect to a horizontal plane, and
  an inclination detection sensor configured to detect an inclination of the display with respect to the horizontal plane, wherein
  the plane including the first axis and the third axis is inclined in accordance with the inclination detected by the inclination detection sensor.

12. The operation apparatus according to claim 8, wherein
  the first operation unit includes a first arm and a first wrist part,
  the second operation unit further includes a second arm and a second wrist part,
  the first driver is arranged in the first arm, and
  the second driver is arranged in the second arm.

13. An operation apparatus control method in a robotic surgical system including a surgical apparatus including a plurality of robot arms configured to support an endoscope, a first surgical instrument and a second surgical instrument; an operation apparatus including a first operation unit that is configured to be operated by a right hand of an operator to receive a first operation for the first surgical instrument and includes a first driver, and a second operation unit that is configured to be operated by a left hand of the operator to receive a second operation for the second surgical instrument and includes a second driver; and a controller, the method performed by the controller, the method comprising:
  receiving a third operation to move the endoscope by the first operation unit and the second operation unit;
  controlling at least one of the first driver and the second driver to maintain a distance between the first operation unit and the second operation unit when the third operation is received; and
  specifying a midpoint of a line segment that connects the first operation unit to the second operation unit, wherein
  controlling at least one of the first driver and the second driver further comprises maintaining a first distance between the midpoint and the first operation unit, and a second distance between the midpoint and the second operation unit when the third operation is received, and
  the midpoint is a midpoint of a line segment that connects a first gimbal point of the first operation unit to a second gimbal point of the second operation unit.

14. The operation apparatus control method according to claim 13, wherein
  the operation apparatus further includes an input configured to allow accepting the third operation to move the endoscope by the first operation unit and the second operation unit during operation by the operator; and
  the controlling at least one of the first driver and the second driver is performed so that the distance between the first operation unit and the second operation unit at the time of a fourth operation of the input device is maintained during a period receiving the third operation and the fourth operation.

\* \* \* \* \*